(12) United States Patent
Jurczyk et al.

(10) Patent No.: US 11,675,102 B2
(45) Date of Patent: Jun. 13, 2023

(54) ASSOCIATED PARTICLE DETECTION FOR PERFORMING NEUTRON FLUX CALIBRATION AND IMAGING

(71) Applicant: Starfire Industries LLC, Champaign, IL (US)

(72) Inventors: Brian E. Jurczyk, Champaign, IL (US); Robert A. Stubbers, Savoy, IL (US); Darren A. Alman, Mahomet, IL (US); Matthew D. Coventry, Champaign, IL (US)

(73) Assignee: Starfire Industries LLC, Champaign, IL (US)

( * ) Notice: Subject to any disclaimer, the term of this patent is extended or adjusted under 35 U.S.C. 154(b) by 0 days.

(21) Appl. No.: 17/210,156

(22) Filed: Mar. 23, 2021

(65) Prior Publication Data

US 2021/0208303 A1   Jul. 8, 2021

Related U.S. Application Data

(63) Continuation-in-part of application No. 16/286,296, filed on Feb. 26, 2019, now Pat. No. 10,955,582.

(60) Provisional application No. 62/635,308, filed on Feb. 26, 2018.

(51) Int. Cl.
*G01V 5/10*      (2006.01)
*G01V 13/00*    (2006.01)
*E21B 47/11*    (2012.01)

(52) U.S. Cl.
CPC ............ *G01V 5/101* (2013.01); *E21B 47/111* (2020.05); *G01V 13/00* (2013.01)

(58) Field of Classification Search
CPC ........ G01V 5/101; G01V 13/00; E21B 47/111
See application file for complete search history.

(56) References Cited

U.S. PATENT DOCUMENTS

| 10,431,412 B2 * | 10/2019 | Akinwande | H01J 27/205 |
| 2011/0044418 A1 * | 2/2011 | Stubbers | G21B 1/19 |
| | | | 376/121 |
| 2011/0062319 A1 * | 3/2011 | Nikitin | G01V 5/101 |
| | | | 250/269.6 |
| 2013/0259179 A1 * | 10/2013 | Naranjo | G21B 3/006 |
| | | | 376/114 |

* cited by examiner

*Primary Examiner* — Hugh Maupin
(74) *Attorney, Agent, or Firm* — Leydig, Voit & Mayer, Ltd.

(57) ABSTRACT

An associated particle-based inspection apparatus is described. The apparatus includes a grounded target region and a neutron generator that produces a neutron and one or more corresponding charged particles. The apparatus further includes an associated particle imaging (API) detector comprising a particle detector that detects the one or more corresponding charged particles, wherein the particle detector comprises at least one particle detector element that facilitates determining a trajectory, origination time, and a velocity of the neutron based upon a detection, by a particular one of the at least one particle detector element, of the corresponding charged particles.

20 Claims, 15 Drawing Sheets

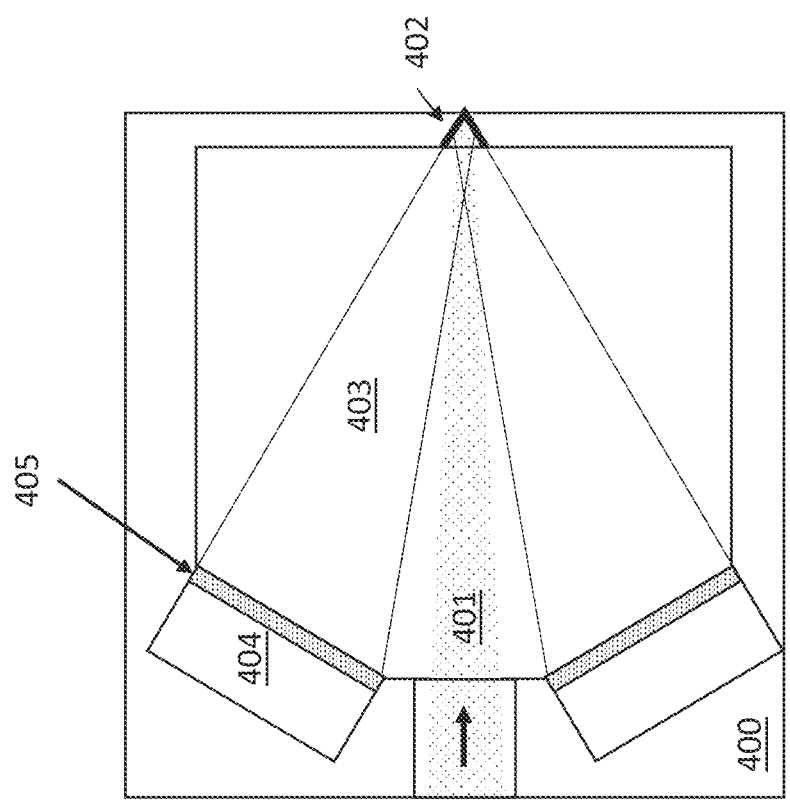
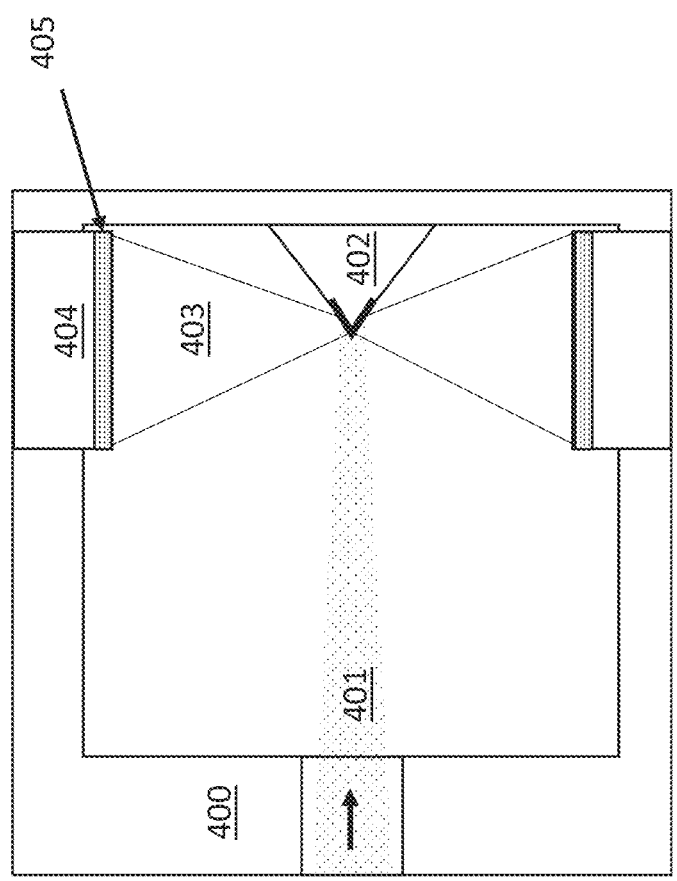
FIG. 4B
FIG. 4A

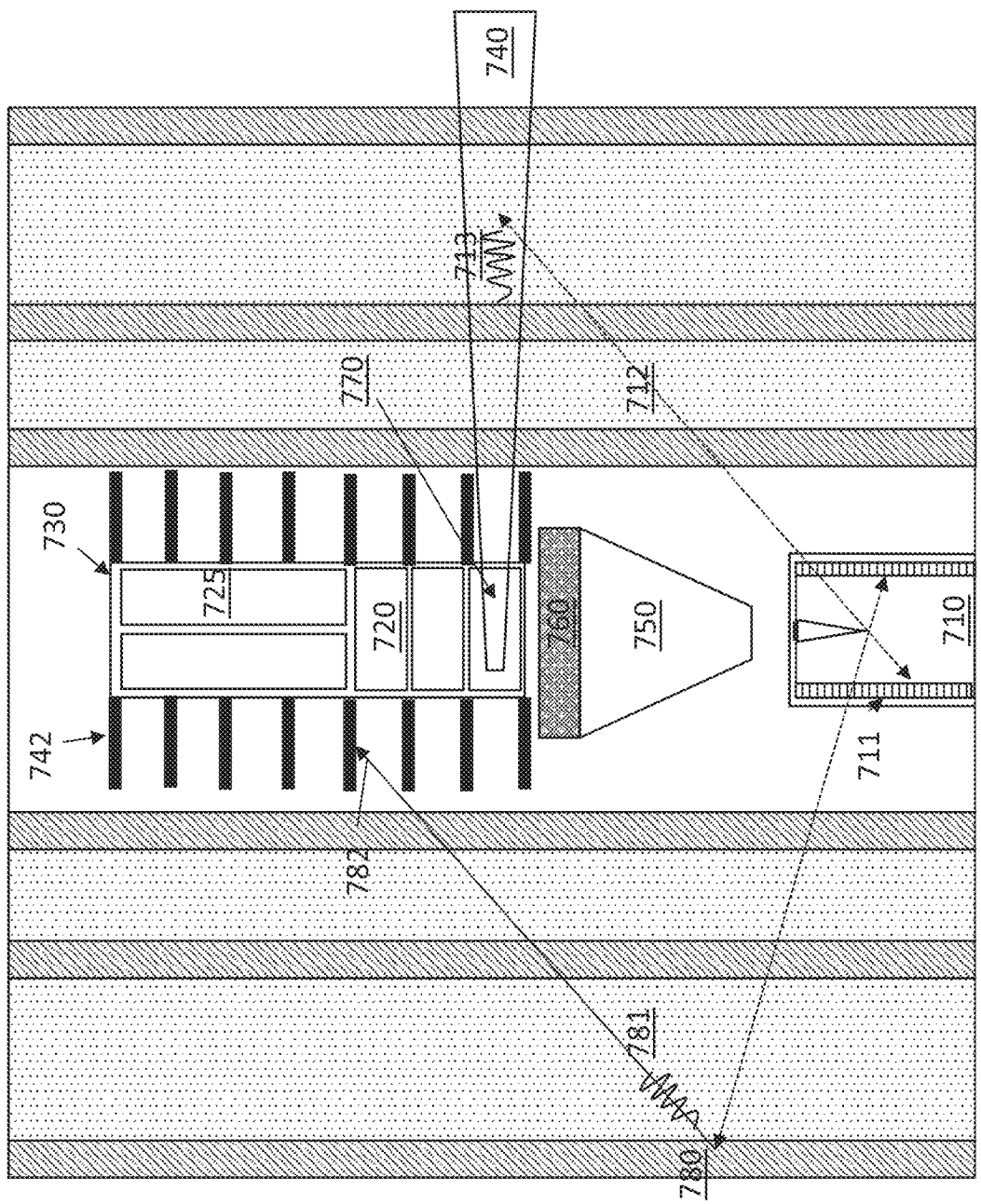

ASSOCIATED PARTICLE DETECTION FOR PERFORMING NEUTRON FLUX CALIBRATION AND IMAGING

CROSS-REFERENCE TO RELATED APPLICATIONS

This application is a continuation-in-part and claims benefit of U.S. Non-provisional application Ser. No. 16/286,296, filed on Feb. 26, 2019, which in turn claims benefit to U.S. Provisional Application Ser. No. 62/635,308, filed on Feb. 26, 2018, the contents of each of which are expressly incorporated herein by reference in their entirety including the contents and teachings of any references contained therein.

FIELD OF THE TECHNOLOGY

This invention relates to associated particle imaging neutron generators including down-hole wellbore inspection systems.

BACKGROUND

The associated particle technique has been historically limited to the deuterium-tritium (D-T) reaction; however, other nuclear fusion reactions could be potentially used including the deuterium-deuterium (D-D) and deuterium-lithium (D-Li) reactions. For the former reaction, the lower energy of the D-D reaction is below the inelastic thresholds of interest for most materials and has not been considered useful until the currently disclosed arrangement. In the case the of the D-Li reaction, high-energy neutrons (>10 MeV) can be generated without the use of radioactive tritium; however, the D-Li reaction is a three-body reaction that is asymmetric and not conducive to the associated particle technique until the currently disclosed arrangement.

To turn a drilled well into a production well, the well must undergo completion. The sides of the wellbore cannot support themselves under the intense pressure and fluid motion underground, so a casing is set into the sides of the drilled well to protect and support the well stream. The casing provides physical support, protection against the ingress of contaminants from the surrounding rock strata and geological layers. The casing also inhibits oil, gas, brine and materials, from other depths, leaking into other layers. For example, the casing prevents extracted oil, from a low depth, leaking into a freshwater aquifer upon which communities and regions depend on for fresh/drinking water. A well casing is fabricated in stages and in segments along the sides of the wellbore. An outer shell of the casing is filled with cement to form a permanent casing.

Typically a casing is made up of sections that are over 10 m long. The sections are screwed together to form long lengths called strings. Each end of the casing section has threading and a collar/joint that threads together with a thread compound to establish a tight seal when section ends are joined/screwed together. These strings are forced/fed into the wellbore with a guide shoe and centered with spring-like centralizers that attempt to hold the strings centered while being fed from a surface rig floor into the wellbore. After the casing is run, drilled out and scratched, a cement slurry is pumped through a plug/float assembly through the casing and out the bottom of the wellbore, displacing drilling fluids and allowed to harden. The introduction and subsequent hardening of the cement slurry permanently affixes the casing to surrounding geoformations and/or additional casings (in a multiple-casing structure) used for additional strength and integrity of the well piping.

A typical oil/gas production well structure has three or four casings. Such casings, in a multi-casing arrangement, include: (1) an outer conductor casing, (2) a surface casing, (3) an intermediate casing, and (4) a production casing. The outer conductor casing is at the surface and is used to center and guide of the overall well completion effort and to limit erosion of surface features during subsequent operations. The surface casing is cemented in place within the hole defined by the out conductor casing. The role of the surface casing is generally to prevent hydrocarbons and gas from encroaching into any freshwater zone and to prevent blow-out of deeper casing sections. The intermediate casing is cemented into place within the hole defined by the surface casing. The role of the intermediate casing is to isolate formations that might breakdown, fragment or collapse into the well causing a loss of circulation, e.g. loose packed and unconsolidated sands. The production casing is cemented into place within the hole defined by the intermediate casing. The role of the production casing is to force oil and gas to the surface. In addition, liners can be used for specific well structure implementations. As is evident from the above summary, each type of casing serves a purpose, and assessing the structural integrity of each of the distinct casings, over the lifecycle of the well, is critically important to avoiding major gas and oil leaks, as demonstrated by the immensely destructive and costly gas leak at Alyso Canyon, Calif.

In view of the differing functions and physical properties, different cements, having differing properties, are used for each wellbore region and casing layer. Slurries are made on the surface with the appropriate density and viscosity and then injected into the well. In general, there are eight types of API Portland cement that can be mixed with: (1) accelerators that shorten the setting time required for the cement, and (2) retarders that lengthen the cement setting time. Additionally, cement density is adjusted using lightweight or heavyweight fillers. Certain additives can affect the compressive strength of the cement and affect its flow properties, to enable the slurry to "squeeze" into regions of the wellbore. Antifoam additives limit trapped bubbles and resulting porosity of the cement. Some companies use extenders to stretch the cement to minimize the amount of material used to reduce cost. Thus, as one will readily observe from the above summary, cementing in an oil wellbore construction is a science all in itself and leads to a wide range of potential structural variations within the wellbore cement structures including: voids, bubbles, trapped drilling fluid pockets and incomplete seals on the casing structures within the wellbore.

A major technology gap exists for measuring the integrity of multiple well casing and cement annuli at intermediate-to-surface depths along major aquifers and ground water zones, where cracks, corrosion and dis-bonding occur, as well as near lateral perforation zones, where an accurate assessment of well integrity is of paramount importance to minimize environmental impact. Material degradation, defects on the installed tubular systems, shifts of ground formations, and other factors can lead to gas leakage, ground contamination, and potentially catastrophic consequences. Periodic, accurate, and complete inspections of the existing production infrastructure are an essential component of modern oil and gas industry maintenance strategy, addressing both operational safety, as well as water and ecosystem sustainability concerns. The presence of geometrically challenging structures, such as multiple concentric well casings, only heightens the need for novel inspection methodologies that work at well construction and during operation to assess changes over the lifetime of the well.

Cement bonding logs have been measured with neutrons. U.S. Pat. No. 9,383,473 describes evaluating cement integrity in a cased well environment using a logging tool with one or more neutron and gamma detectors. Neutron porosity logs are obtained before and after the casing is placed between open and cased holes. Along with the well dimensions, material composition and other parameters are input quantities to a multi parameter database, plus information that is constructed from the wellbore environment, the volume fraction of cement in the channels can be estimated. Various forms of this technique have been used by loggers when interpreting simple cased formations and making correlation log comparisons. However, this approach is limited to a singular or dual detector for azimuthal asymmetry and eccentricity error in cement/casing placement. For aquifer-zone stacked casings that are 3-5 distinct casing layers thick, this basic method fails to provide sufficient information to satisfactorily ensure wellbore integrity. For casings that have thin cement due to eccentricity, there is a potential for cracking, corrosion and fluid ingress/egress—leading to a breach in the well containment and integrity. The ability to detect a crack/malformation in any single layer is lost in the averaging for singular or dual detectors.

Additionally, U.S. Pat. No. 9,746,583 describes another approach that incorporates a dual neutron and x-ray excitation mode to increase the level of both radiation types in the well casing structure. The described inspection probe has a plurality of detection assemblies to receive backscattered radiation from the well structure to provide azimuthal information integrity. However, published results on this technique suggest x-ray spectra generation from conventional bremsstrahlung sources was insufficient to obtain data beyond the first casing due to too low photon energy, spread spectrum, and high-power requirements for the x-ray system. Monoenergetic gamma sources (i.e. Cs-137, 2Ci) with higher penetrating power and well-defined energy distributions were needed for signal-to-noise and count rejection to resolve smaller defects. However, isotropic gamma emission required heavy physical collimation and loss of signal fidelity due to noise floor issues for pure backscatter analysis.

Very high-energy 14 MeV neutrons from the D-T fusion reaction generate inelastic gamma-rays from within the well casing, formation and surrounding material in the well environment. These inelastic gamma rays are emitted with spectra that are unique to the nucleus of the element encountered. The energy of these inelastic gamma-rays are usually above 1 MeV and have the ability to reach detectors in the tool string of a down-hole wellbore inspection apparatus. Well service companies, such as Schlumberger, Baker Hughes, Weatherford, Halliburton, etc., regularly use D-T fusion reaction neutrons for interrogating formations and creating pulse neutron logs. The Schlumberger PULSAR™ tool uses a pulsed D-T generator with three (3) scintillator detectors to detect both neutrons and gamma rays coming from the generator and the formation. The neutrons and gamma-rays are used to generate a spectral analysis of the formation, calculate the formation density and porosity, and other parameters of interest for oil and gas exploration, well completion and reservoir characterization.

An advanced technique for hybrid neutron-gamma imaging is associated particle imaging (API). The API technique was developed in both the US and Russia in the 1990s and is most commonly used with the D-T fusion reaction. The 14 MeV neutron produced by a D-T fusion reaction has a corresponding alpha particle at 3.5 MeV traveling in the opposite direction. If a detector can record the alpha particle position and time, the recorded alpha particle detection event can be correlated with the neutron position and trajectory. Fast neutron inelastic collisions generate subsequent gamma-rays that can be detected. Based on the timing of the gamma ray, speed of light propagation in the medium, neutron time of flight, and alpha detection time; a correlation can be inferred to associate the gamma ray with the neutron position to determine the photon point of origin. This technique is used for non-transmission imaging. For example, U.S. Pat. No. 8,338,777 and US Application Publication No. 2013/0327933 describe the API technique for performing measurements while drilling, where the neutron source is located near the drill bit and the gamma-detectors can image the vertical placement of material and determine the formation density for steering a horizontal wellbore formed in shale.

A neutron generator technology described in U.S. Pat. Nos. 9,607,720 and 9,728,376 enables the generation of neutrons from the distal end of the generator head from a small spot on an extended snout in the head of the generator apparatus. The snout allows very close coupling of the neutron emission region with detectors, shielding, moderator and collimator materials for significantly improved neutron flux utilization. A grounded neutron-generating target enables close coupling with detectors.

SUMMARY OF THE INVENTION

An associated particle-based inspection apparatus is described herein. The apparatus includes a grounded target region and a neutron generator that produces a neutron and one or more corresponding charged particles. The apparatus further includes an associated particle imaging (API) detector comprising a particle detector that detects the one or more corresponding charged particles, wherein the particle detector comprises at least one particle detector element that facilitates determining a trajectory, origination time, and a velocity of the neutron based upon a detection, by a particular one of the at least one particle detector element, of the corresponding charged particles. The neutron generator includes a positively-biased ion source and a neutron generating source point that receives an ion beam from the positively-biased ion source through a vacuum tube assembly. The neutron generating source point provides a directed volume of corresponding charged particles, the vacuum tube assembly comprises a hermetically-sealed vacuum vessel that couples the positively-biased ion source and the grounded target region, the grounded target region contains the API detector and the neutron generating source point, and charged particle detection events are transmitted from the particle detector array to external sensors through a coupling that preserves hermetic sealing of the hermetically-sealed vacuum vessel.

An inspection apparatus is also described that includes a grounded target region and a neutron generator that produces, by a fusion reaction, a neutron and one or more corresponding charged particles. The apparatus further includes an associated particle imaging (API) detector comprising a particle detector that detects the one or more corresponding charged particles, wherein the particle detector comprises at least one particle detector element that facilitates determining an absolute calibration of the neutron generation rate based upon a detection, by a particular one of the at least one particle detector element, of the corresponding charged particles. The neutron generator includes a positively-biased ion source and a neutron generating source point that receives an ion beam from the positively-biased ion source through a vacuum tube assembly. The neutron generating source point provides a directed volume of corresponding charged particles. The vacuum tube assembly comprises a hermetically-sealed vacuum vessel that couples the positively-biased ion source and the grounded target region. The grounded target region contains the API detector and the neutron generating source point, and charged particle detection events are transmitted from the particle detector array to external sensors through a coupling that preserves hermetic sealing of the hermetically-sealed vacuum vessel.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 4A, 4B, and 4C illustratively depict an integrated API detector and neutron generator in accordance with the invention;

FIGS. 7A and 7B illustratively depict two illustrative arrangements of collimating structures for a gamma detector including collimation and spatial segmentation features in accordance with an illustrative example;

DETAILED DESCRIPTION OF THE DRAWINGS

Figure 1:
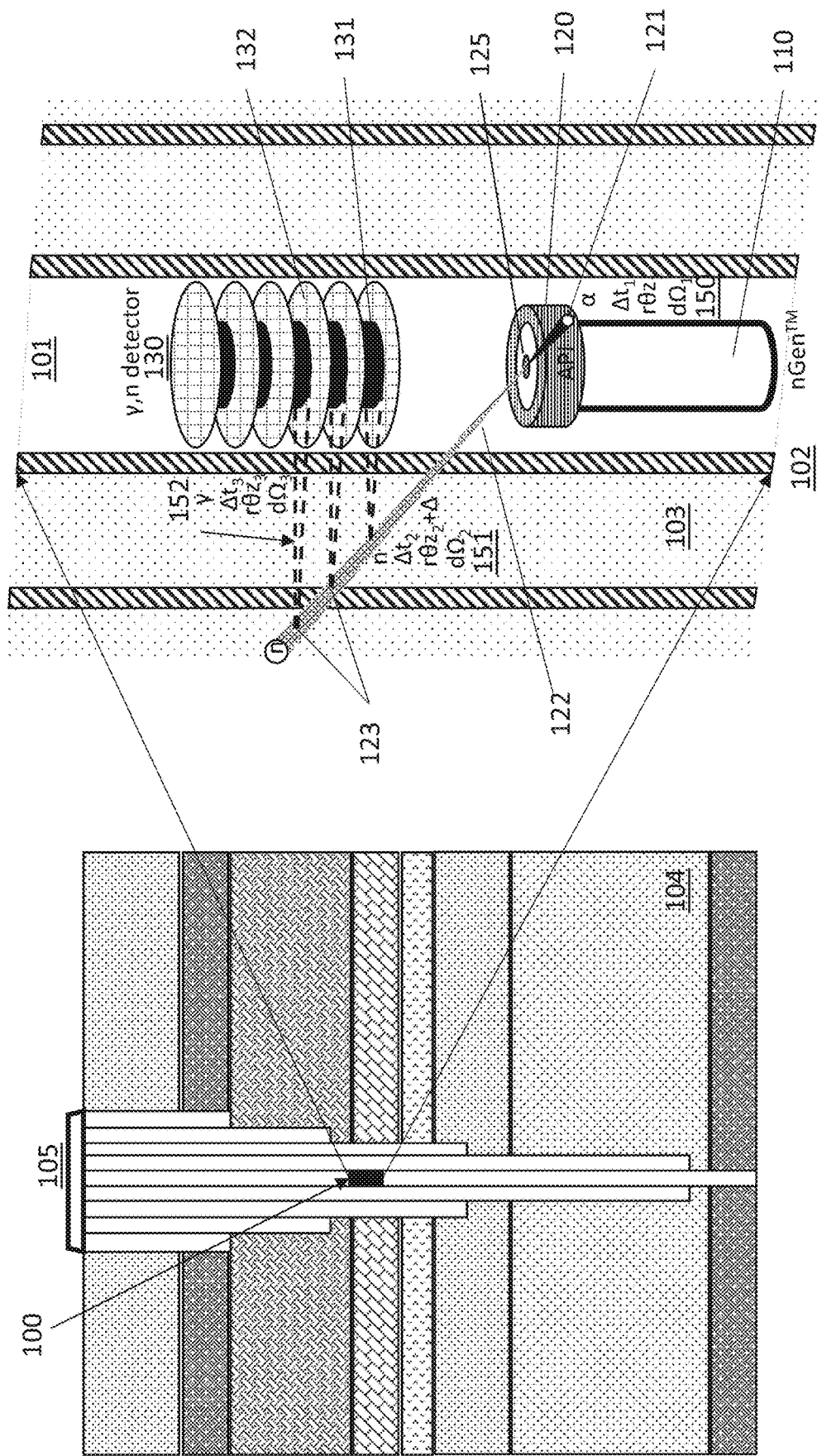
FIG. 1 schematically/illustratively depict the concept of associated particle imaging (API) in accordance with the invention.

A neutron-gamma imaging system is described herein that is capable of generating an image of structures that lie beyond the innermost production casing in an oil and gas well structure. The extended imaging capability facilitates confirming, with a higher degree of certainty and confidence, the integrity of the equipment infrastructure outside the wellbore. Such imaging is enabled by incorporating a high-output neutron generator into a down-hole wellbore inspection apparatus that uses associated particle imaging (API) technique that includes a collimated gamma-ray detector. The resulting inspection apparatus and imaging operation facilitate spatial, temporal, material (energy) imaging and integrity assessment of distinct cement, casing and formation structures. The 14 MeV D-T fusion reaction neutron has very high penetrating power into structural formations and is therefore suitable for generating an image of a multi-layered near-surface and aquifer zone cement and casing structure. Combining neutron-gamma API data and backscatter neutron and photon information, and potentially other sensing modalities, facilitates assessing, with a higher degree of detail and assurance, a well structure integrity in the presence of multi-layered casing structures. In particular, D-T fusion reaction neutrons ejected by a neutron generator and resulting high-energy photons have a penetrating energy to propagate through the multiple cement/casing annuli for interrogation of structures in and around the wellbore. Combining data from both the neutron and photon modalities lowers the potential for error, reduces false positives and improves wellbore casing structure imaging/assessment fidelity.

The down-hole wellbore inspection apparatus and associated imaging operations have the potential to facilitate ensuring wellbore integrity for older producing and gas storage wellbores, where casing integrity may be an issue, and for new horizontal wells that are hydraulically fractured in areas with large populations and subsurface water sources. Improved three-dimensional imaging and associated wellbore assessment may also lower environmental risk across the entire wellbore/casing structure lifecycle—i.e. construction, completion, production, secondary recovery, gas storage and capping.

In operation, the wellbore inspection apparatus includes a collimated sensor, operating in concert with a D-T fusion reaction neutron generator to detect in-situ gamma rays arising from inelastic neutron scattering events to render azimuthal images of wellbore casings, cement and geological formations proximate the wellbore for well integrity. The imaging apparatus, in operation, uses spatial, temporal and localization from associated particle imaging, time-of-flight and timing analysis, and energy analysis.

The down-hole wellbore inspection apparatus described herein comprises a neutron-gamma imaging system capable of rendering images of structures falling, in relation to the inspection apparatus, beyond a production (innermost) casing to determine structural integrity of the wellbore casing/containment structure. An azimuthal neutron-gamma API technology is described herein that includes a high-output D-T generator that operates in concert with an associated particle imaging (API) technique that processes event data rendered by a collimated gamma-ray detector to render spatial, temporal and material imaging, and discrimination of the cement, casing and formation conditions associated with an inspected wellbore and radially surrounding structures. An azimuthal neutron-gamma API technology is applicable for all wellbore integrity evaluations during construction, at completion/perforation and during periodic assessments.

Wellbore structure integrity is a multidisciplinary approach where engineers interact with different disciplines to assess the status of well barriers and well barrier envelopes always. The apparatus and imaging technique described herein is appropriate for use in wellbore/casing structure: (a) construction, (b) completion/perforation, (c) operations/interventions and (d) end-of-life abandonment. The inspection apparatus may operate in concert with other sensing and well logging modalities for compliance with NORSOK D-010, ISO TS 16530-2 and other applicable standards.

Turning to FIG. 1, an exemplary wellbore structure (including multi-layered casings) is depicted along with a down-hole wellbore inspection apparatus 100 in accordance with an illustrative example. The illustrative inspection apparatus 100 comprises three aspects/sub-components: (1) a neutron generator assembly 110 including a target 125 that generates a tagged neutron 122 and a corresponding charged particle 121, (2) a charged particle detector 120 (API detector 120), and (3) a gamma-ray detector 130.

A wide variety of apparatuses are contemplated for the charged particle detector 120. The particular design selections for the API detector 120 structure include: material, energy response time, fall time (scintillation/carrier clearing time), pixilation size, readout material, electronics processing, noise, protection of the detector material against electrons, photons, neutrons and ions, all of which are considerations that exhibit associated engineering tradeoffs.

Another variable choice of the wellbore inspection apparatus 100 concerns placement of the API detector 120, including: a field of view, a forward-looking direction and a mating to the neutron generator assembly 110 including the neutron-generating target 125 (as shown by way of examples provided in FIGS. 4A, 4B and 4C described herein below).

Additionally, the gamma ray detector 130 has selectable characteristics having operational implications on the inspection apparatus 100, including: detector material type, effective density and energy resolution, collimator style, detection efficiency, scintillation time, neutron vs. gamma sensitivity, pixelization, and external collimation. The spacing and placement of the pixelated charged particle detector (API detector 120) and the gamma-ray (and neutron) detector 130 determine/establish operational features of the inspection apparatus 100, including: solid angle resolution, and a timing basis for generating an effective voxel within a field of view of the inspection apparatus 100.

With continued reference to FIG. 1, the inspection apparatus 100, using associated-particle imaging (API), distinctly tags the tagged neutron 122 by detecting the corresponding charged particle 121 (e.g. α or $^3$He) that is generated from a fusion event at the target 125 occurring within the neutron generator assembly 110. The inspection apparatus 100 illustratively depicted in FIG. 1, includes a combination of the neutron generator assembly 110, the API detector 120 and the gamma-ray detector 130 (indirect detector of the tagged neutron 122). Since both the corresponding charged particle 121 (e.g. alpha from D-T fusion, $^3$He from D-D fusion) and the tagged neutron 122 energies (and derived velocities) are known, a solid angle trajectory information 150 and a timing data can be calculated from the charged particle 121 measurement and assigned to the tagged neutron 122 injected into the wellbore environment to (in turn) generate a corresponding solid angle, trajectory and timing data 151 since the detected corresponding charged particle 121 is existentially linked with the tagged neutron 122.

Additionally, inelastic collision-induced gamma-rays 123 are correlated 152 with the tagged neutron 122 to calculate: a collision location within a three-dimensional space (azimuthal radial direction, vertical height), element type (gamma energy magnitude), etc. Based on signal timing delays from the alpha particle detection (i.e. the solid angle trajectory information 150), the neutron solid angle trajectory 151, a gamma detection 131 by the gamma-ray detector 130, and a specific gamma spatial collimation information 132, a voxel of origin of the gamma-ray 123 can be determined.

To that end (determining a voxel of origin), during a well logging trip down a wellbore, precise timing data, API and gamma-ray detector information are captured and stored— for example in sequential (time-ordered) list mode for subsequent spatial/voxel position resolution and matrix analysis. Alternatively, the stored information is analyzed in real-time as the wellbore inspection apparatus 100 travels through a well bore to aid real time decision making including dwelling on a region for higher degree of statistical certainty of wellbore image accuracy and structural integrity of the imaged wellbore structures. Thus, with continued reference to FIG. 1, individual layers of the strata, such as a strata layer 104 can be identified and/or a well casing/cement system 105 can be inspected. In the illustrative example, the gamma-ray detector 130 is optionally equipped to perform: gamma ray detection, neutron detection, and/or a hybrid combination of both gamma ray and neutron detection. The gamma-ray detector 130 assembly utilizes physical photon and neutron collimation structures 132 and also relies on temporal, spectral and pulsed data separation and segmentation to enable resolving a voxel from which a detected gamma-ray energy or detected particle originated within a collimated radial field of view. Azimuthal information, as well as radical depth, into the well casing environment can be calculated for the borehole environment 101, well casings 102, cement 103 and any defects, fluids, imperfections, voids and contaminant material in proximity.

The inspection apparatus 100, using the API technique to process the sensed corresponding charged particle 121, constructs corresponding spatial information for the tagged neutron 122. The gamma-ray detector 130 and any particular one of multiple collimated gamma-ray detector sub-assemblies (defined by the collimation structures 132) on the gamma-ray detector 130 that is positioned on a radial wellbore azimuthal slice of interest can be correlated with the detection events recorded by the API detector 120 in the neutron generator assembly 110. High-fidelity imaging information gained for the structure surrounding a wellbore can improve signal-to-noise, reduce error, and enable defect identification while reducing false positives using time-of-flight, energy, angle and interaction probability. While the above description is generally directed to generating image data associated with a particular spatial voxel element, the described hybrid neutron-API/collimated-gamma approach can be operated/performed to acquire sets of azimuthal data that is processed to build, on a volume element-by-element three-dimensional image of a cased wellbore environment to directly image steel 102 and cement 103, pulse squeezed cement repair, bond regions, casing collars, water ingress, corrosion, and voids and the present of fluid from inside or outside the well stack. Information on the wellbore environment 104 can also be obtained.

Figure 2:
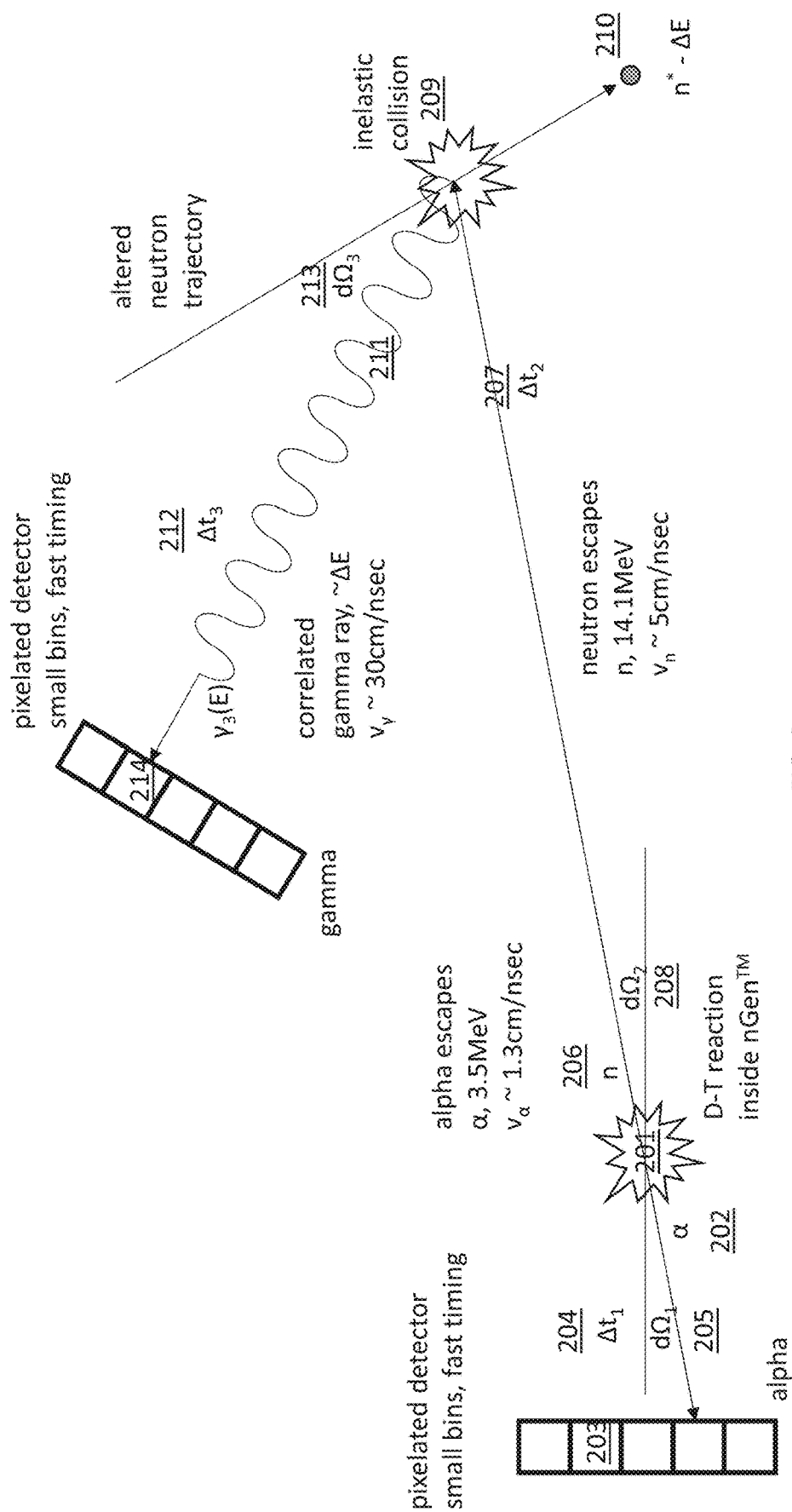
FIG. 2 illustratively depicts an illustrative example of the process for associated particle imaging in accordance with the invention.

Turning to FIG. 2, a detailed illustration is provided of the coordinated API and gamma-ray detection functionalities facilitated by the wellbore inspection apparatus 100 depicted in FIG. 1. Initially, a nuclear reaction 201 taking place in the neutron generator 110, generates a 180-degree correlated pair including a charged particle 202 (corresponding charged particle 121) and a neutron 206 (tagged neutron 122). The charged particle 202 travels in a path towards an element within an alpha particle detector array 203. Based on a distance from the nuclear reaction 201 and the element within the detector array 203, a specific timing data and a solid angle for charged particle emission 205 are calculated. Since to energy of the nuclear reaction 201 (i.e. a D-T fusion reaction) is well characterized, the speed of the charged particle 202 is well known to give correlated information on the (tagged) neutron 206 having a solid angle trajectory 208 and a timing 207 tagged data.

Additionally, when the neutron 206 has an inelastic collision with a specific material at an inelastic collision point 209 in the wellbore formation or casing structure regions, kinetic energy is converted into a photon 211. The photon 211 is detected by a particular detector array element on a spatial gamma-ray detector array 214. The neutron 206 emission has certain allowable times 212 for arrival of a resulting photon 211 on a detector element of the spatial gamma-ray detector 214. The allowable times 212 are established based upon correlations of time and a spatial relationship 213 based on the speed of electromagnetic waves in a particular electromagnetic wave propagation media. This speed of propagation data can also be correlated with dielectric constants in the material for additional characterization of the environment.

Figure 3:
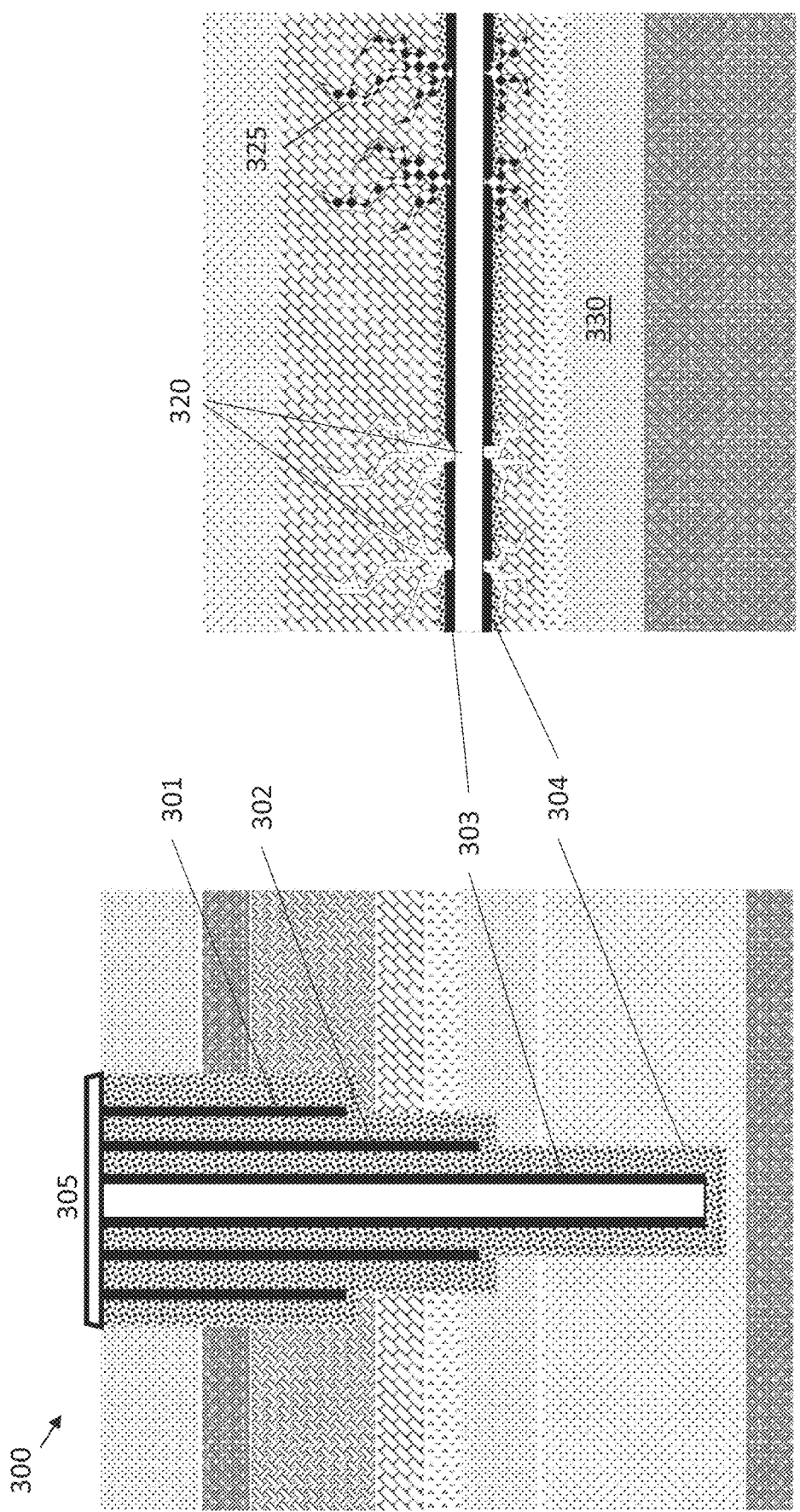
FIG. 3 illustratively depicts a casing and cement down-hole wellbore environment to operate the API apparatus in accordance with embodiments of the invention.

Turning to FIG. 3, an exemplary arrangement of a multi-casing combination for a Marcellus shale well is shown. The illustrative example includes a 5½" (140 mm) or 7" (178 mm) diameter for a production casing 303 that is cemented to an inside diameter of 9⅝" (244 mm) of an intermediate casing 302. The intermediate casing 302, in turn, is cemented to an inside wall of a 13⅜" (340 mm) of a surface casing 301 that is, in turn, affixed to a well platform through a 16" (406 mm) and/or 20" (508 mm) conductor casing cemented to a ground surface 305. A cement structure 304 thus encapsulates the various casing components of the multi-casing combination structure. Casing wall thicknesses depend on many factors including pressure, weight and length for the string with 0.5" being a typical number with approximately ⅛" drift diameter over each casing pipe run in a casing string. Therefore, a well integrity inspection system is expected to interrogate and analyze casing and cement within the formation out 200-250 mm radius from the inner wall of the production casing 303.

The potential impacts/benefits from this API gamma-neutron imaging technique include:

(1) assurance of the long-term integrity of boreholes by removing the major technology gap in measuring the integrity of multiple well casing and cement annuli at intermediate-to-surface depths along major aquifers and ground water zones, where cracks, corrosion, and disbanding occur where there are 2 to 5 stacked casing/cement rings;

(2) improved characterization/visualization of a fracture 320, for example, in the production casing 303, fluid emplacement, gas and fluid flow, and stimulated rock volume between and within wells; enabled and increased ability to see through or behind production casings located in gas wells hence removing a major industry issue;

(3) positively impacted surface and groundwater resource protections stemming from effective monitoring and mitigation; eliminate false negatives in existing well integrity data; for example, undetected gas channels in cement bond logs have led to aquifer pollution;

(4) remedied well integrity flaws enabled by a well-integrity inspection capable of providing enhanced information about the flaw structure and topology of conventional and unconventional gas wells to recognize and remedy these flaws and their negative effects;

(5) minimized environmental impact of unconventional mining that pose many challenges for well inspection, both at the construction stage, as well as during operation; this is particularly true in the environmentally sensitive aquifer depth region, as well as in the vicinity of lateral perforation zones, where an accurate assessment of well integrity is of paramount importance to minimize environmental impact;

(6) improved evaluation of the quality of the fractures 320 near each perforation zone enabling minimization of environmental impacts and improves the efficiency of UOG development, by increasing primary recovery without having the need to increase well density and by enabling improved recovery from fewer and less-impactful wells;

(7) improved maintenance of a commercially-viable level of well functionality stemming from the provided assessment of the quality of the hydraulic fractures near each perforation zone through neutron and gamma-spectral analysis of the proppant material used in the fracture 325;

(8) improved recovery from fewer and less impactful wells; improved efficiency of UOG development with increased primary recovery without the need to increase well density; and (9) environmental safety benefits stemming from the lack of use of radiochemical sources (Am-Be, Cs-137) materials for well integrity and monitoring of fracture characterization with small amount of tritium usage that will not require long-term monitoring in the event of a breach.

Embodiments of the described systems incorporate, for example, compact neutron generators such as those described in U.S. Pat. Nos. 9,607,720 and 9,728,376. The described neutron generators utilize a grounded neutron-generating target in a small, sealed form factor for close placement with detector arrays for sensing corresponding alpha particles and gamma rays.

Figure 4C:
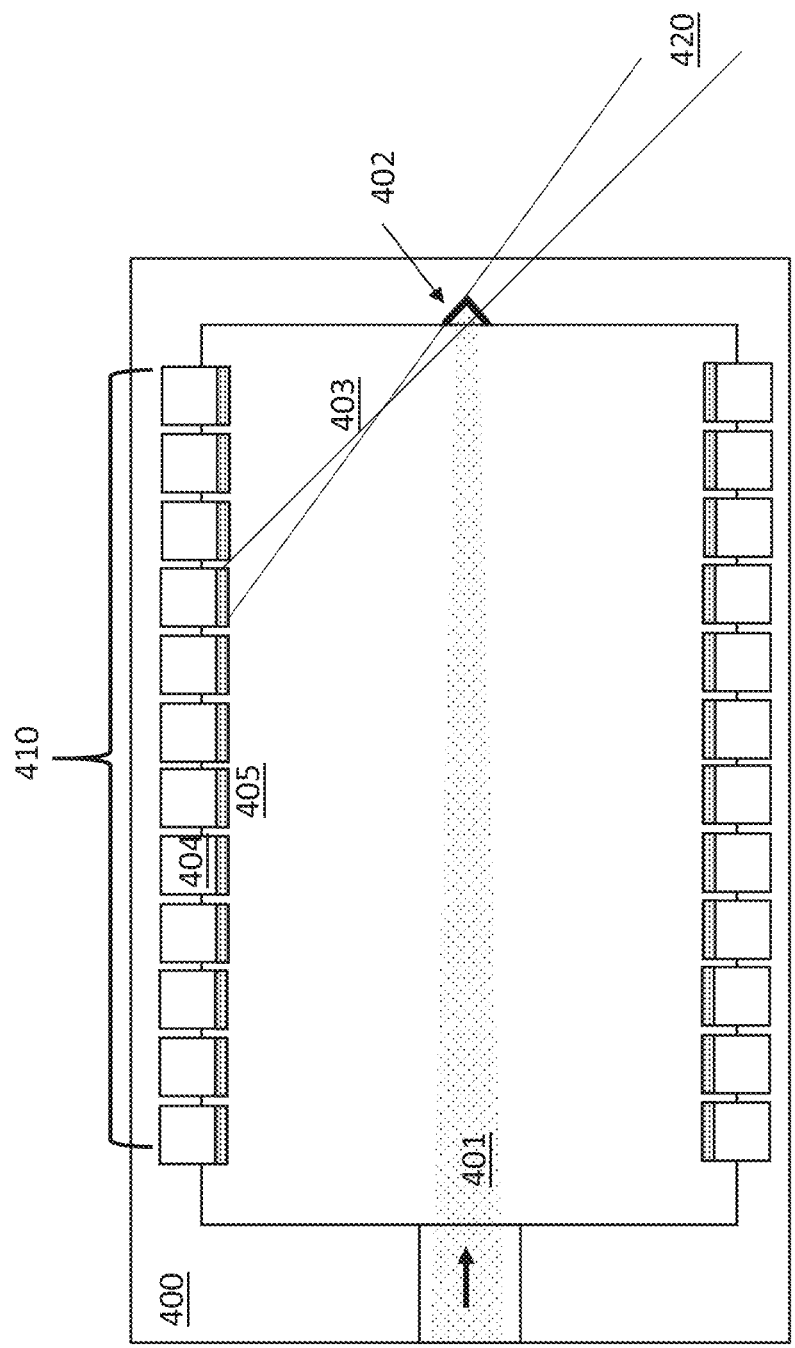

FIGS. 4A, 4B and 4C depict detailed views of a grounded target region of the neutron generator 110 for API detector 120 integration with different detector and target layouts. The depicted arrangement is enabled by using a positively-biased ion source to direct an ion beam 401 onto an end-mounted target/neutron-generating source point 402 (the neutron-generating target 125 in FIG. 1). A grounded target region 400 is separated from regions of high electric field or accelerating gradient allowing placement of a charged particle-detector 405 and supporting signal detection and processing hardware 404 around a perimeter of the target for close coupling with the end-mounted target/neutron generating source point 402.

The close coupling in a field-free region mitigates vacuum arcing, flashover and discharging between internal structures of the neutron generator assembly 110 and the sensitive API detector 120 array elements. The grounded target region in the neutron generator assembly 110 mitigates high-voltage arc breakdown and electron beam heating issues that would be present with conventional neutron generators using negative-biased targets on insulating columns in cavities. Shielding material is placed between the API detector 120 array elements and the outer housing of the neutron generator assembly 110 to minimize influence of external photons from generating noise in the electronics and detectors.

There are two general approaches for the neutron generating source point 402. One is to use a nominally radial placement (FIG. 4A) of the charged particle detectors and the other is for angled placement (FIG. 4B) of the charged particle detectors with a more forward-looking view for the neutrons. The choice of placement of the charged particle detector elements/arrays with respect to the source point 402 (target 125 in FIG. 1) and their configuration and placement has a direct impact on the size, shape and shielding of the gamma-neutron detection suite for associated gamma-ray detection and imaging. In the illustrative examples, a very intense ion beam 401 is focused onto a shaped target making up the neutron generating source point 402 that contains a hydrogen entraining material, such as titanium hydride, for high brightness neutron emission.

One approach is for highly radial API detector placement as depicted in FIG. 4A with placement of the charged particle detector 405 and supporting signal detection and processing hardware 404 at near 90 degrees relative to the ion beam 401 on a target that is exposed for more radial solid angle 403 to the charged particle detector 405.

Another approach, depicted in FIG. 4B shows placement of the charged particle detector 405 and supporting signal detection and processing hardware 404 in a forward-looking configuration accommodating a recessed neutron generating target for use as the neutron generating source point 402. This configuration allows a longer throw-distance 403 between the charged particle detector 405 and the neutron generating source point 402 to improved length/diameter product for improves angular resolution of the detected charged-particle and improved solid angle resolution on the correlated neutron.

Turning to FIG. 4C, a hybrid arrangement is depicted wherein the charged particle detector 405 is positioned along the grounded target region 400 of the neutron generator in a spatially-modulated rings or segments 410 along an internal wall of the neutron generator assembly 110 and API detector 120 assembly. This arrangement allows for both a radial and a forward-looking neutron correlation 420. The grounded target region 400 can readily accommodate detector array elements of the API detector 120 that are placed to provide 360° sensor array coverage on the vacuum tube assembly to directly image the alpha particles arising from generated neutrons that are injected into the casing-cement-formation structure for typical production pipe and casing diameters. Shaping the neutron generating source point 402 is important for both heat rejection for the focused impinging beam and for collimating the effective alpha particle emission volume 403. Shaping the target region 400 facilitates controlling the charged particles that are directed towards the detectors and limiting/setting the effective field of view for the API correlated gammas.

Figure 5:
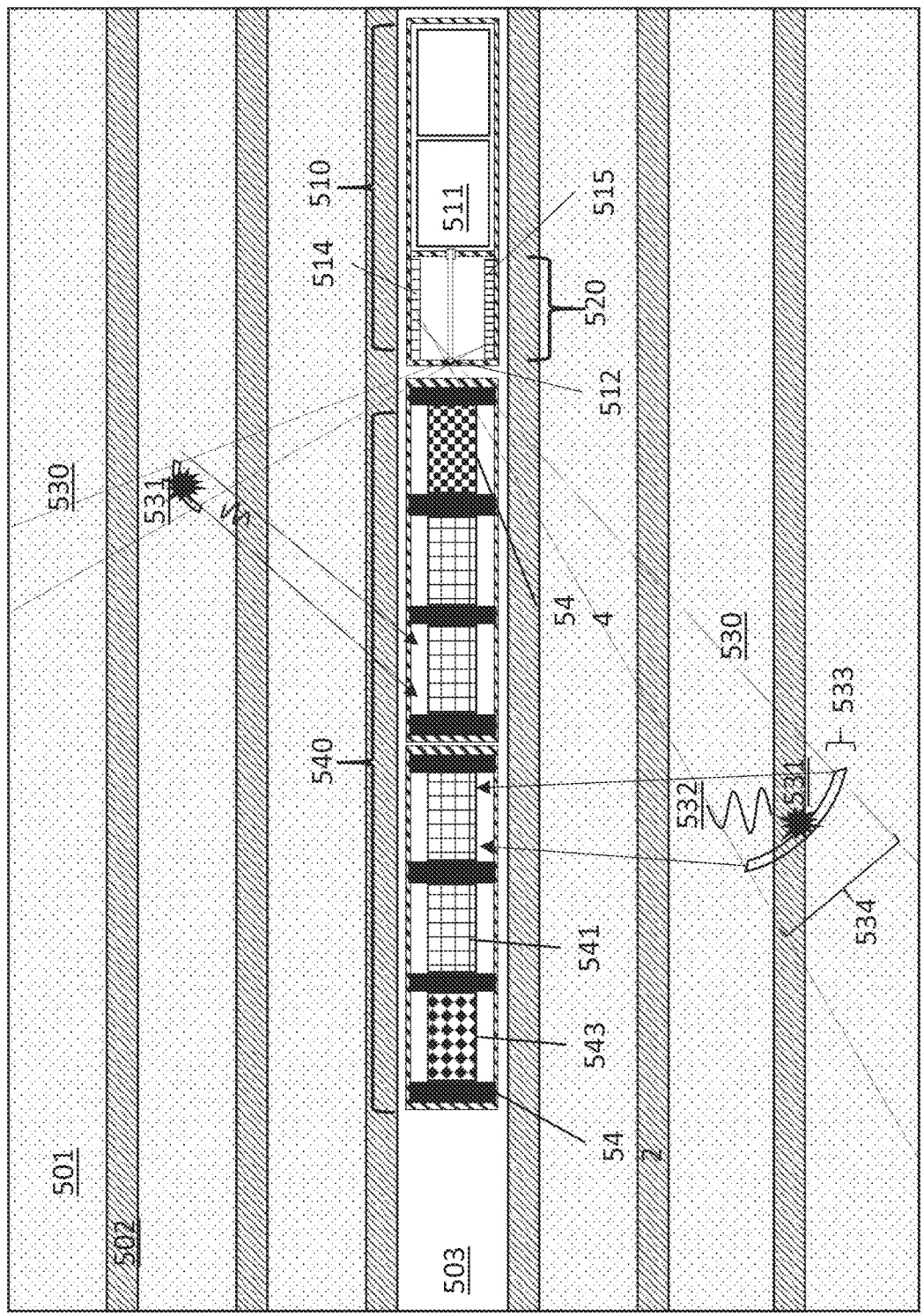
FIG. 5 illustratively depicts, in detail, integrated API neutron generator and gamma-neutron detector scheme for multi-modal imaging in a down-hole wellbore.

Turning to FIG. 5, additional details are provided with regard to the operational mechanics of the downhole neutron-gamma API imaging tool referred to herein as the wellbore inspection apparatus 100. A wellbore casing-cement environment includes a cement 501 and a casings 502 that are spaced annularly outward from a bore 503. The wellbore imaging apparatus 100 includes a neutron generator 510 and an integrated API detector 514 including an array of detector array elements 515 located in a grounded region 520. An (intense) ion beam 511 impinges on a small-diameter spot 512 to generate a nuclear fusion reaction. The reaction causes a neutron generation and a corresponding charged alpha particle impacts charged surface of the integrated API detector 514 comprising detector array elements 515 and gives spatial/temporal information on the flight trajectory of the neutron 530 that corresponds to the sensed corresponding charged alpha particle. The API detector 514 includes array elements 515 having a fine spatial resolution that facilitates determining a trajectory information 530 of the corresponding neutron that results in a smaller voxel volume vs. an array elements 515 having a relatively course resolution. Thus, sensor array elements 515 present a tradeoff between higher resolution and resulting cost of the sensor assembly used to obtain trajectory data for an emitted neutron, which affects the overall accuracy of calculated voxel positions associated with gamma-rays detected by a gamma ray detector 540.

In operation, when the emitted neutron has an inelastic scattering event 531 with a material, a high-energy photon 532 is emitted that is captured by a detector suite of the gamma ray detector 540 comprising multiple collimated arrays of gamma ray detection elements 541. In the illustrative example, four collimated arrays are depicted (one per section of the collimated sensor assembly of the detector 540. By way of example, LaBr or CLYC scintillators are used for making up the elements of the gamma ray spectral detection elements 541. Additionally, a purely thermal neutron detector array 543 and a epithermal neutron detector array 544 are used. However, all scintillating/gamma-detectors with pulse height and shape discrimination are sensitive to neutrons for an all-in-one technique. Physical collimation structures (eight in FIG. 5), such as a collimator 542 structure, are used to restrict the field of view for gamma-rays or neutrons entering the detector assembly 540. By way of example, a high Z material (e.g. lead, bismuth or tungsten) is used for photon the collimator 542. Cadmium is, for example, a suitable threshold epithermal material, and boron is a suitable pure thermal shielding material.

With continued reference to FIG. 5, a typical tool sizing suitable for all of the well casing scenarios is 3⅜". A 43-mm radius gives enough clearance for drift in the production casing to minimize the chance of the wireline tooling becoming jammed/lodged in the casing. With allowance for tool exterior, vacuum environment, electronics, supporting hardware and the actual API detectors themselves, a good distance from the neutron spot to the radial detection elements is ~30 mm.

To take advantage of high source rates, very high speed charged particle detectors are needed and a range is used; e.g. diamond, silicon, $BaF_2$, ZnO:Ga,H, others. Semiconductor and scintillating material each have unique advantages for charged particle detection and readout to the outside world. Coupling through a hermetic seal in the neutron tube is straightforward via a fiber optic faceplate or image transfer plate to couple light from the scintillating surface inside the neutron tube to photodetectors or electronic readouts on the exterior. The use of single photon avalanche photodiodes (SPAD) and silicon avalanche photomultipliers (SiPMs) offer the potential for very high speed with spatial resolution capability vs. conventional PMT-based approaches. Light extraction from scintillators with engineered interfaces for increased light collection to improve signal-to-noise is used. Nanofiber optic faceplates are ideal for segmented light guides vs. optimized conventional photomultiplier tubes. We use Ce:YAG, ZnO:Ga, SiC and diamond detectors with Si-avalanche PD for alpha detection for speed and accuracy. There is a tradeoff in maximum count rate, pixel resolution and solid angle will be made, as well as quantum noise and dark current. These opto-electronics systems measure the photon light response and calculating the x-y position based on light magnitude is done in a relatively straightforward list-mode detection and data scoring. These particle scintillating materials are coated with a thin protection layer of a conductor to stop charging and provide a reflective layer to direct photons to the electronic detector and readout. The thickness selected is enough to stop low-energy electrons and x-rays but admit the MeV-class charged particle, e.g. 3.5 MeV alpha particle.

The temporal positioning of the neutron is dependent on the fast scintillation time of the API detector itself. Materials such as ZnO:Ga have a 25 ps scintillation rise time for triggering into the time-stamp electronics. For a 3.5 MeV alpha particle from the D-T reaction traveling at 1.3 cm/ns into ZnO:Ga the corresponds to a 0.325 mm timing error for neutron placement in the formation along the straight-line trajectory for a 1-mm neutron emitting spot. The high-speed detector electronics become the time-limiting step for accurate quantification of timing in list mode for data capture. The temporal thickness 533 of the neutron voxel will be smaller than the spatial width 534 based on the finite neutron emission spot size 512 and API detector coarseness 514 or fineness 515.

With continued reference to the examples provided in the combination of FIGS. 4C and 5, a 30-degree assortment of API detectors up the axial wall, as shown in FIG. 4C and FIG. 5, this gives an effective maximum distance of 52 mm. With a 1-mm effective neutron emission spot size 512 with a precision fine API detector array 515, this translates into an axial error 534 in neutron placement at the outer edge of the production casing of 3.33 mm from the closest API detector in region 420 to the neutron spot 512. At the edge of the intermediate casing, the axial error is 5.1 mm and at the edge of the surface casing the error in axial position due to solid angle is 6.67 mm. Given that the steel casing thickness is 0.5", the correlated API error in neutron placement 15-50% of the casing thickness. For the furthest API detector in region 420, the error 534 in neutron placement at the edge of the production casing is still 3.33 mm; however, it is a mixture of both axial and radial error because of the angle of interrogation.

Neutron production rates of 1E8-1E11 D-T neutrons per second are achievable within the tool form factors with <<2 mm spot sizes achievable. The 14-MeV neutrons from the d(t,nα) reaction will not only penetrate further into the wellbore environment and will generate element-specific inelastic gamma-rays from neutron interactions with each casing, cement layer and the outer formation as the neutrons slow down. These inelastic gamma-rays are element specific and contain spatial, temporal and energy information that is used to characterize the well integrity.

Figure 6:
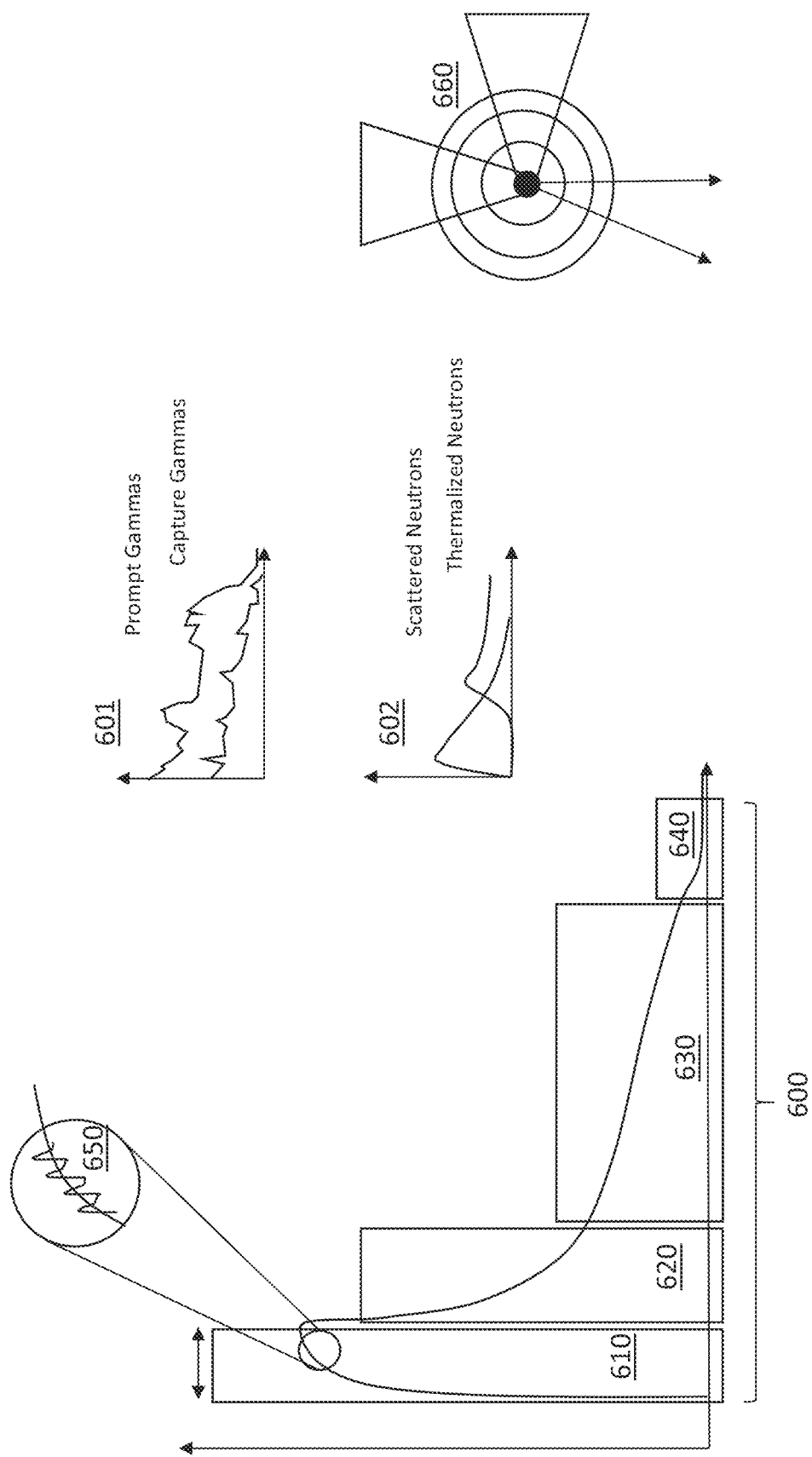
FIG. 6 illustratively depicts, in detail, a pulsed operation of the API neutron generator for downhole analysis including prompt gamma, delayed neutrons, scattered neutron and thermalized neutron spectra.

Turning to FIG. 6, various aspects are highlighted for an integrated pulsed D-T fusion reaction neutron-gamma interrogation system of the type described herein. An intense, high-output burst of D-T fusion reaction neutrons are generated on a pulse width that is less than or on-order of neutron thermalization time in a formation period 610. During this time, inelastic neutron collision-induced gamma-rays are generated from the fast neutron interactions in the formation leading to directed, API-tagged, directional gamma-rays for interrogation. Full-energy spectral information 601 is gathered for energy and elemental analysis during the formation period 610.

During a neutron slowing period 620, after the pulse is terminated, there will be a rapid decay in inelastic gamma rays with a transition to thermal captures. The sharp slope and information on the exponential decay and energy cutoff from the gamma-rays detected that will give information on the relative slowing down, material composition, density, void percentage, porosity and presence of information relevant to lithology as well as the well casing environment.

Thereafter, during a thermal captures period 630, neutrons slowing down and detected gamma rays will give more PGNAA spectra and wider elemental composition information. In addition to gamma-rays, there is the epithermal and thermal neutron response from a formation 602. This slowing down and scattering cross-section information gives specific information that is correlated with water content, void presence, bubbles in the cement, etc.

Thereafter, a termination region 640 is characterized by the final decay and approach to zero of corresponding alpha particle and gamma-ray detection, and this period will give information on the remaining total cross section in the formation and well casing.

Spatial information 660 including basic azimuthal information and axial segmentation will be based on the physical collimation in the gamma/neutron detector system vs. the timing and associated particle information in the formation period and subsequent interaction with the well casing and formation environment over each interrogation period 600.

Additional pulse forms (see modulated waveform in a blown up waveform segment view 650) are superimposed on the main inelastic gamma ray pulse to investigate very fast exponential decay information to gain specific fast-time scale information vs. the bulk of the well casing and cement, lithology or fracking characterization. The method of using pulsed neutrons for time gating and windowing to detect the inelastic neutron collision-induced gamma rays and prompt capture of gamma rays separately for a pulsed neutron generator is highly effective at improving the signal to noise for the API technique while allowing traditional neutron and capture gamma ray spectroscopy.

Figure 7B:
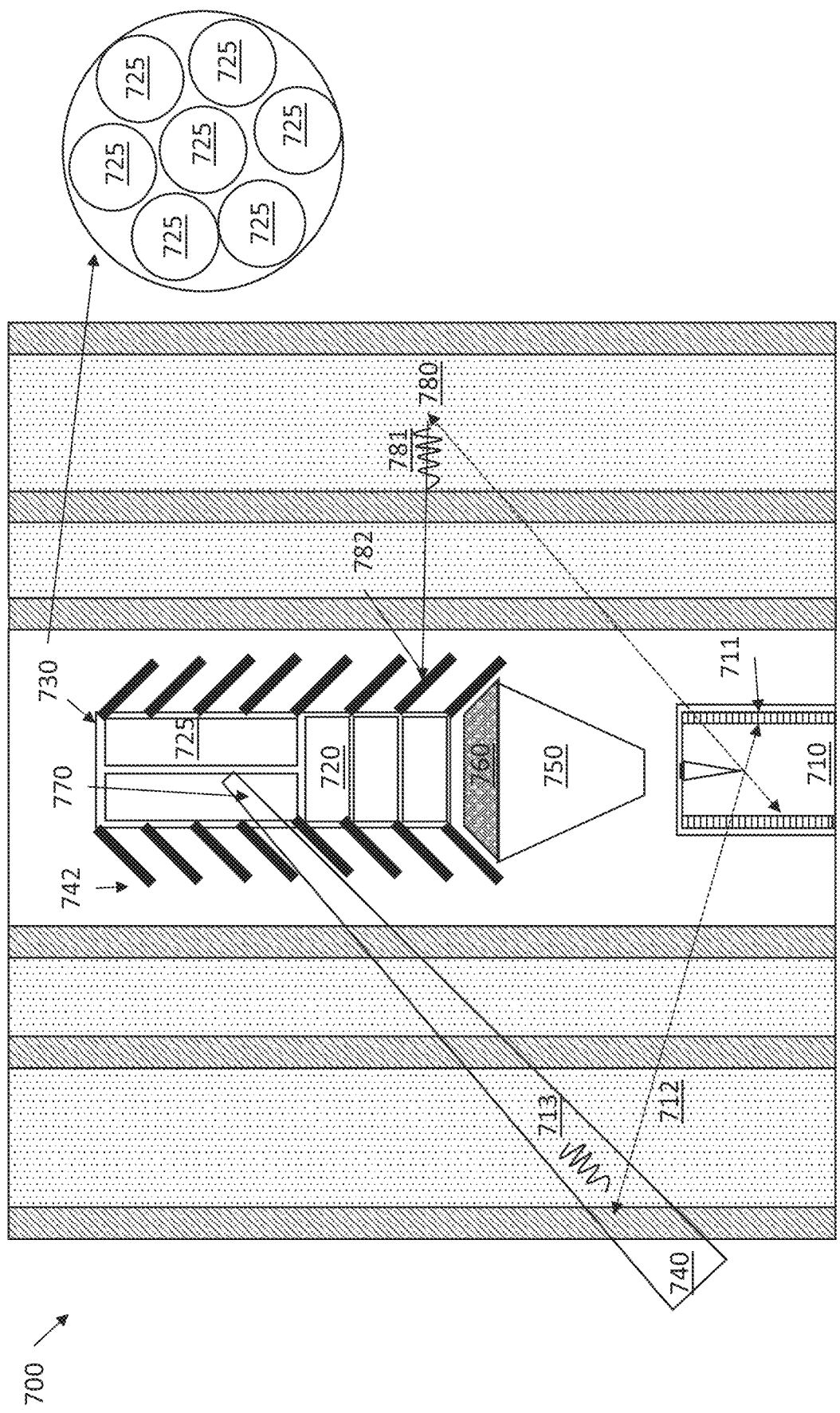

By way of example, an illustrative embodiment of the wellbore inspection apparatus (see FIG. 5) incorporates physical collimation structures to block/absorb gamma rays prior to reaching detector elements at the gamma-ray detector array. The use of physical collimation structures prevents certain gamma ray data from being acquired by the gamma ray sensor arrays. However, blocking non-collimated gamma-rays improves overall signal to noise ratios with regard to the gamma ray data that is acquired. A particular approach to collimation, per FIG. 7A, is to have the collimating structures oriented (as shown by the collimation structured depicted in FIG. 1) to provide an opening for the gamma detector array elements to look directly radially outward (at a 90 degree angle) with respect to the wellbore running direction. Another potential approach to collimation, per FIG. 7B, is to have the collimating structures (in this case a series of cone-shaped structures) oriented to provide an opening for the gamma ray detector array elements to look at an angle towards the neutron generator 110 and the API detector 120. The gamma ray detector can have many discrete levels or segments that look at one or more reference neutron planes (or non-plane conical-shaped volumes defined by the collimation structures) that may be intersecting or discrete. For example, the detector segments can: (1) observe a same volume in space, (2) observe a series of non-overlapping parallel volumes, (3) observe a series of non-parallel/intersecting volumes, etc. Additionally, placing the gamma ray detector elements closer to the wellbore side allows higher sampling count statistics and potentially better imaging quality. A larger diameter of the gamma-ray sensor arrays allows higher fractional capture of the full energy waveform for elements of interest.

Turning to FIGS. 7A and 7B, a further embodiment of a gamma-ray/neutron detector 730 (also referenced as 130 in FIG. 1) is provided in a wellbore environment 700 to highlight aspects of the various physical structures discussed above for collimating photons received by the gamma-ray detector 730 and physical segmentation of gamma-ray sensor element arrays of the gamma-ray detector 730. For example, a gamma-ray detector element array 720 is depicted in an orientation where a set of such element arrays are stacked vertically, and each element array corresponds to an opening defined by the collimating structures that define a path for receiving gamma rays from the wellbore 700. Another sensor element array orientation, as shown by a gamma-ray detector element array 725 (a configuration of which is illustratively provided in cross-sectional view in FIG. 7B), is a set of azimuthally arranged gamma-ray detector element arrays. In the case of azimuthally arranged detector element arrays, each array receives gamma rays from multiple openings defined by the collimating structures at particular azimuthal ranges.

With continued reference to FIGS. 7A and 7B, shielding is provided between the gamma-ray detector 730 and a neutron generator/API detector suite 710. In particular, additional shielding materials (e.g. a first shield material 750 and a second shield material 760) inhibit detecting fast/thermal neutrons (by the first shield material 750) and gamma-rays (by the second shield material 760) emitted directly from the neutron generator/API detector suite 710. Shield materials 750 and 760 can be placed nearby the gamma/neutron detector 730 (beyond what is depicted here, design dependent) to restrict scattered photons and neutrons from the well environment that may interfere with detector response, counting statistics and count-rate.

As explained above, when a neutron is generated by a D-T fusion reaction, the API detectors in the neutron generator/API detector suite 710 capture a corresponding charged alpha particle at a location 711 and facilitate generating a corresponding neutron trajectory 712. The neutron experiences an inelastic collision within a casing wall 713 that results in a collimated gamma-ray travelling with a viewing region 740 that is detected at a specific time by the gamma ray detector array 724. The viewing region 740, defined by a set of slanting collimating structures 742, enables the selected preference to photons on a defined solid angle for detecting gamma-rays arising from inelastic collisions by neutrons generated by the neutron generator/API detector suite 7103. Segmenting the gamma-ray detector elements into a set of arrays allows for a linear improvement in saturation level and managing dead time. Segmenting the gamma ray detector elements into a set of arrays also provides a means for azimuthal or axial segmentation to restrict photon counting. One configuration has the gamma detector arranged as an array of vertical tubes (e.g. array element 725) to provide azimuthal segmentation/sectorization and viewing. The collimating structures 742 are generally fabricated out of high-Z, high-density materials for photon stopping power, such as W and Pb.

In both FIG. 7A and FIG. 7B, inelastic neutron collision-induced photons 781 generated in a non-resolvable location 780, are stopped at location 782 by the collimating structures 742. For the 3⅜" diameter tool this limits detector sizes to approximately 2" diameter arranged in a 3-way triangle. These detectors are alternatively stacked to provide azimuthal dependence and to maximize the detector volume in the wellbore. Another setup is to have large diameter 3" scintillator crystals for higher energy deposition and higher-gamma response that is important for the inelastic gamma rays under the API inspection method. Here physical collimation in discs 720 is appropriate with optimization in height for full energy attenuation.

For tooling that is for large diameter wellbores, such as 7" production casing with an ID of −5.875", there are many more options for detector placement, gamma-ray spatial modulation and discrimination. Physical collimation using angular shields is feasible to admit only specific gamma-rays from particular solid angles. Such systems could be used for accurate well analysis, long dwell imaging and full characterization of the wellbore environment to generate a 3D composite picture of the well casing and cement integrity.

$LaBr_3$ provides good energy resolution, fast scintillation response and strong light output.

The data captured in list mode enables the summation of gamma signals and neutron signals from multiple discrete detectors for reduction in error. One approach is to use discrete gamma collimation/filtering, and another is to preserve raw data and use more gating, timing, pulsing and time-of-flight for discrimination, correlation and importance weighting for error reduction.

In operation, the neutron generator is pulsed to provide a temporal aspect to the neutron and gamma-ray detection scheme. Short neutron pulses with a pulse width less than the neutron thermalization time in the formation will yield element-specific gamma rays that are tagged with the associated particle from the fusion reaction. These fast neutrons will generate unique inelastic collision gamma rays from element-specific nuclear interactions and the resulting gamma-ray spectroscopy using the gamma-ray detector suite will provide the azimuthal and radial location of these elements. The properties of the well casing, cement, formation, fracture proppants, repairs, etc. can be determined from these visualized inelastic gamma-rays generated from the fast neutron interaction. Thereafter, the neutrons show down and eventually are captured by materials generating capture gammas or diffuse back to the detector suite for neutron event counting. Some neutrons are fast, some are mid-range energy, and some are slow for thermal capture. The levels of signal, timing and azimuthal positioning of this information allows the reconstruction of the well casing and surrounding environment for fused data processing. The inelastic neutron collision-induced detected gamma-ray signal image will have specific imaged features and the remaining captured gamma-ray signals and neutron captures will provide higher count-rate statistics on stopping power, thermalization length, element distribution, neutron scatter range, water, oil, etc.

The combination of signal sensing modalities facilitated by the wellbore inspection apparatus (and operating modes) described herein enables several investigations to occur simultaneously. The data on carbon/oxygen (C/O) ratio can also be obtained for reservoir characterization simultaneously with well casing integrity analysis. Activation of oxygen by the neutron generator and the subsequent flow and transport are imaged and visualized for flow and movement of material around the well casing and wellbore environment.

The azimuthal neutron-gamma API correlation analysis method and apparatus described herein can selectively discriminate "only the photons that matter" to reduce the effective noise and admit high-fidelity data for analysis. Photon counts that are not correlated can be thrown out for one analysis but still used with other detection algorithms, e.g. neutron and gamma backscatter logs in similar manner to standard correlation logs. The spatial and temporal data can be stored in list mode and analyzed with AI algorithms as the surface for complete 360-degree well characterization. API well integrity casing systems that can fit in a small diameter are ideal to allows scanning of nearly 100% of production wells.

The innovation herein is used to obtain conventional gamma density, neutron porosity, sigma, C/O ratio, PGNAA (prompt-gamma neutron activation) elemental analysis, fluid flow and elemental image mapping of the well casing, cement, collar and fracture zone with proppant placement. Azimuthal fracture visualization and proppant placement for resource recovery from the perforation zone is another added advantage of this technique. Detection of defects, fractures, leaks, corrosion, material loss, gaps in casing, eccentricity error in casing centralization, annulus gaps in cement, voids and pipe dis-bonding are imaged with this system.

Figure 8A:
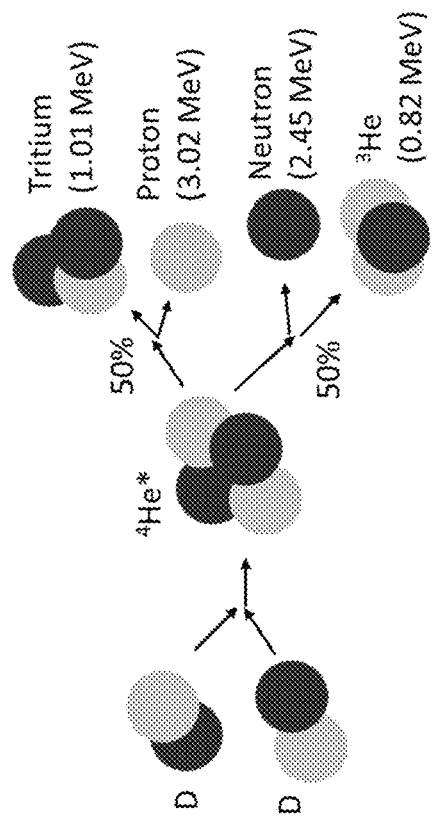
FIGS. 8A and 8B illustratively depict two different fusion reactions (i.e. D-D and D-Li), and the resulting charged particle and neutron distributions in accordance with the disclosure.

Another advantage of in-situ detection of associated charged particles inside the neutron generator is an ability to carry out an absolute calibration of the neutron output. Turning to FIG. 8A, there are multiple species available for the D-D reaction. $D(d,n)^3He$ and the $D(d,p)T$ reactions are roughly 50-50 split. Both tritium and $^3He$ are usable for performing absolute calibration. However, the proton branch is the most easily achieved because its range is highest. In the case of the $D(t,n)^4He$ reaction, the resulting emitted helium possesses sufficient energy that it is easily detected in the same way as the D-D proton.

Figure 8B:
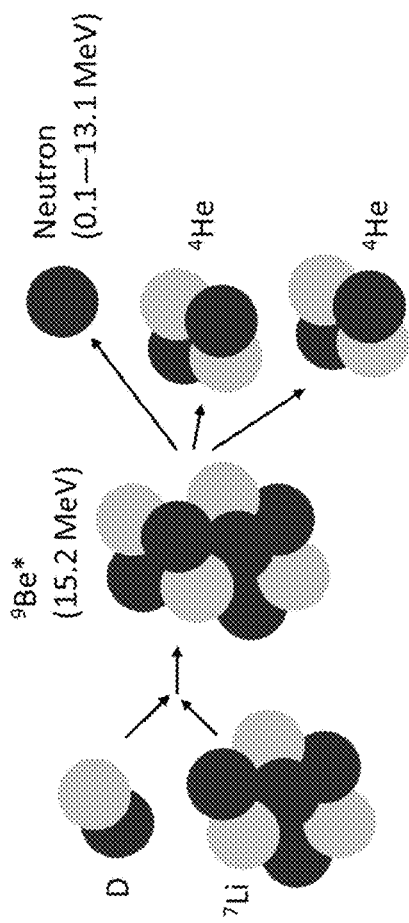

Turning to FIG. 8B, the $^7Li(d,n)^8Be$ reaction is highly advantageous to performing absolute calibration because it produces high-energy neutrons far in excess of the inelastic threshold. The resulting two alpha particles are depicted in FIG. 8B in addition to the neutron. The total energy released from a positive Q value of 15.2 MeV is shared between the neutron and the two alpha particles. Multiple MeV alpha particles are detected with in-situ detectors in the neutron generator target assembly.

Figure 9:
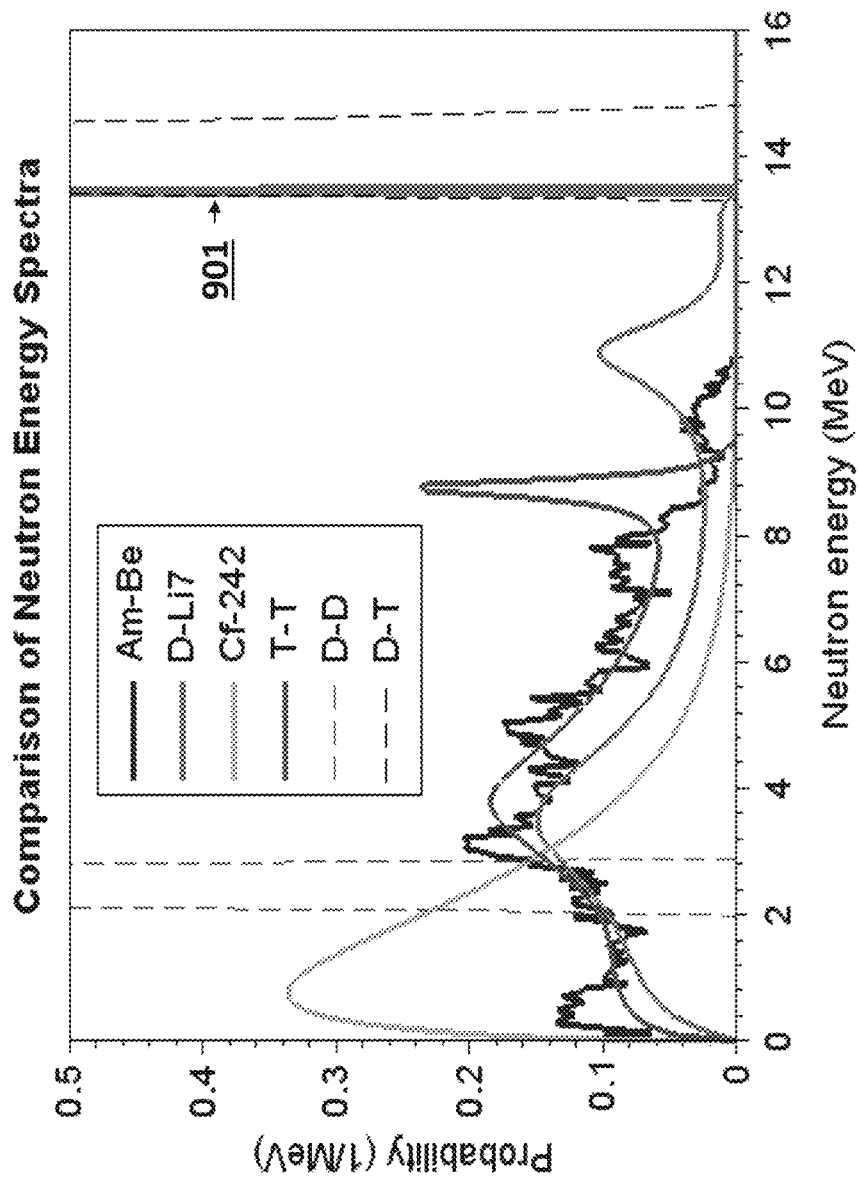
FIG. 9 illustratively depicts a comparison of neutron energy spectra for various fusion reactions, including T-T, D-Li, D-D and D-T fusion reactions in accordance with the current disclosure.

FIG. 9 highlights a comparison of neutron energy spectra including those for T-T, D-Li, D-D and D-T reactions. The D-Li reaction has a large spread in energy of the neutron and the corresponding associated charged particles. The more information determined about the resultant charged particles, the greater precision and knowledge that can be achieve with regard to the corresponding neutron emission.

The particle detector array, described herein, detects corresponding charged particles from the fusion reaction, and a direct, quantitative measurement of the true neutron generation rate regardless of external shielding, material, collimators, and other radiation. This is advantageous in situations where quantitative statistics on neutron emission are desired for reaction rate control, stability and total fluence over a period.

Because the non-neutron reaction products are produced in a known proportion to produced neutron, measuring a production rate of one, or more, of the associated particles provides a way to estimate a neutron production rate without directly measuring, or perturbing, neutron output. This approach works for D-D reactions as well as D-T reactions. However, determining neutron production rate is easier to accomplish with D-D reactions for the absolute output measurement because the proton-producing reaction is used since a unique correlation with an emitted neutron is not needed. The proton is desirable because the 3-MeV proton has a significantly longer detection range in materials (approximately 58 μm in titanium) than the other charged-particle reaction products.

Figure 10:
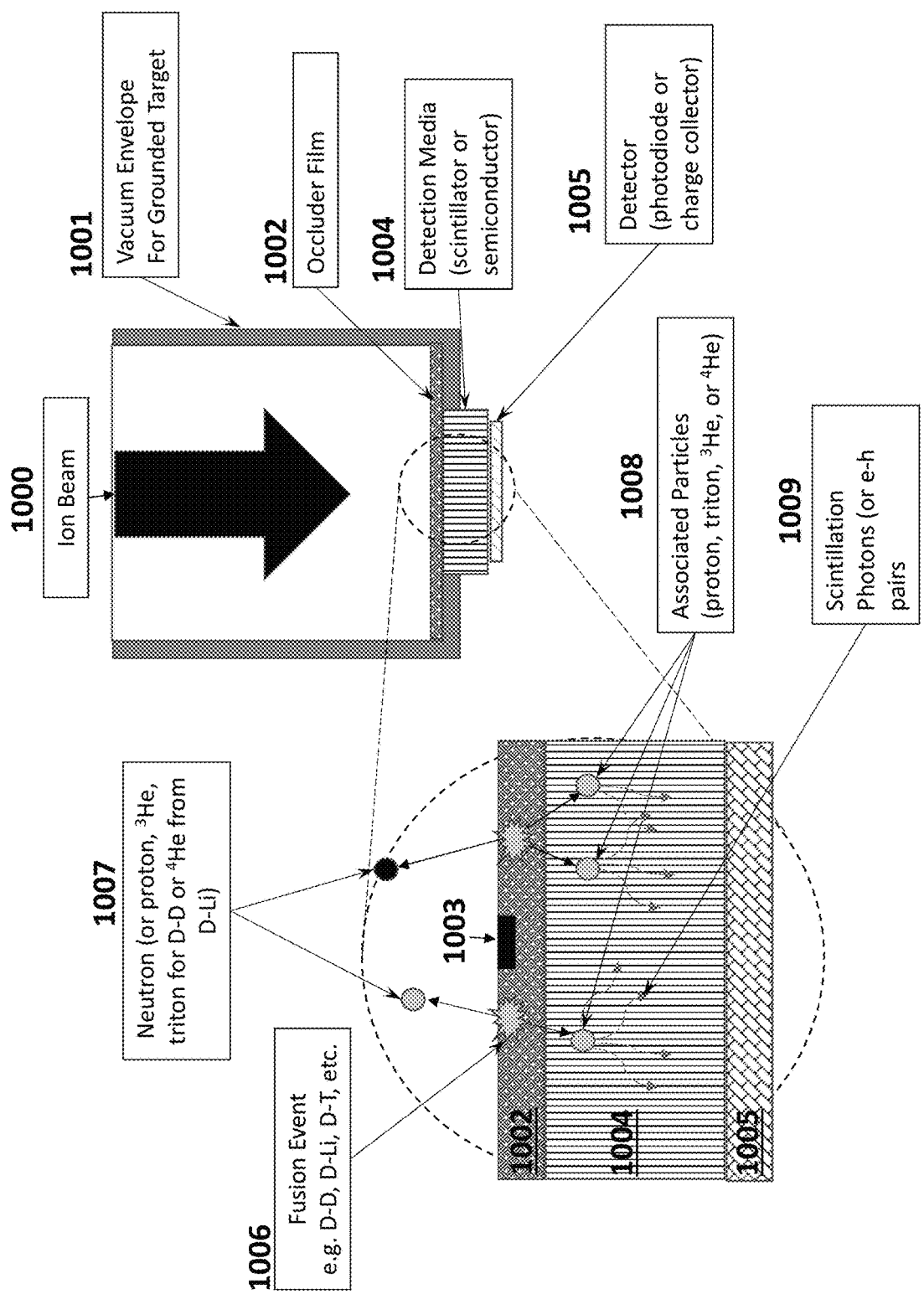
FIG. 10 illustratively depicts an arrangement for carrying out direct measurement of associated particles from the occlude film for performing a quantitative assessment of fusion reaction rate in accordance with the disclosure.

Turning to FIG. 10, the particle detector array disclosed herein is also directly-coupled to a neutron-generating target for directly measuring charge-particles from the fusion reaction with large solid-angle geometric capture efficiency. An ion beam 1000 from the neutron generator ion source and acceleration column (not shown) enters the vacuum envelope of a grounded target 1001 and generates fusion reactions within an occluder film 1002. The ion beam 1000 energy is insufficient to pass through the occluder film 1002 and transfers its energy in a shallow volume 1003. Fusion events 1006 are generated from a selected reaction (e.g. D-D, D-T, T-T, D-Li, D-Be, etc.) resulting in associated particles being generated, which enter a detector media 1004. Exemplary ways of carrying out detection of associated particles include: scintillator, semiconductor (diode or phototransistor), and vacuum-electronic multiplier (channel multiplier, microchannel plate, gaseous tube detector).

Depending on the type of media corresponding signals (e.g. photons, electron-hole pairs or cascading electrons) 1009 are generated within the detection media 1004 and detected on a corresponding detector 1005. In the case of a scintillator media, the associated particle detector receives the charged particle through a thin membrane (to stop detection of stray light) into a scintillating material (such as YAG:Ce or sapphire). The light produced is then detected, either as a pulse stream or as a continuous signal amplitude. Detecting the produced is accomplished in any of many potential ways including: one or more photomultiplier tubes, photodioes, photo transistors, and microchannel plate detectors. In the case of a semiconducting media, a charged particle is stopped in a semiconductor device, thereby generating ion-electron pairs in the material. The ion-electric pairs allow an electric current to flow through the semiconductor device, which constitutes an electric signal that can be analyzed.

The associated particles are also detected using vacuum-electronic devices, of which there are many varieties. One well-known type of device is a Geiger-Muller (GM) detector. In this example, the associated particle penetrates a thin window to enter the GM detector volume. The GM counter contains a gas that is ionized by the associated particle, creating ion-electron pairs. The ion-electron pairs are accelerated by an electric field applied to the GM detector, collide with the gas, and create more ion-electron pairs; thereby amplifying an initial effect of the associated particle into a breakdown event that generates an electrical pulse. Under different biasing and gas-fill conditions, a proportional counter can be made which generates electrical pulses having amplitudes proportional to the detected associated particle's energy. Alternatively, an ionization chamber is used that produces a current having a magnitude related to the associated-particle energy flux (frequency and energy) entering the detector. The above are examples of simple gaseous-electronic detectors that are used in exemplary arrangements. Vacuum electronic detectors can also be used. For example, channel-multipliers and microchannel-plate multipliers, and traditional multiplier cascades may be used in alternative/additional arrangements. These devices all work with on a similar principle, which is that the incident associated particle strikes a cathode electrode, causing secondary electron emission. The multiplier (any type) accelerates the resulting electrons into another location where yet more electrons are generated. This is repeated several times to amplify the electrical signal from the initial associated particle impact.

High-energy photons (x-rays and gamma-rays) pollute the signal to varying degrees. The influence of x-rays on the associated particle signal can be separated/filtered/subtracted in several ways. For pulse counting methods, the amplitude of the pulse and/or the shape of the pulse can be analyzed to differentiate charged-particle events from photon events. Another method is to have a reference detector, which may be identical to the detector, but is shielded from/blind to the associated particles. The reference detector detects only the stray radiation (x-rays for instance). The reference detector provides a reference signal level that allows the associated particle contribution to be determined by scaling and subtracting the reference signal from the associated particle detector signal. This approach can also provide an added benefit of providing temperature compensation to ensure the result is minimally influenced by temperature variation, which can be significant for all of the detection techniques.

As discussed earlier, the associated-particle detector is usually located a distance from the neutron-producing target but faces the target so that the associated particles can reach an active portion of the detector. While using a grounded target allows improvement on this geometry (collection efficiency, simplicity, etc.), it also allows a different target-detector relationship. A grounded, or at least low-voltage, target allows the detector to be part of the target assembly structure. For instance, the occlude film (usually titanium) can be coated onto, or placed over, the associated particle detector. This is particularly convenient for solid-state associated particle detectors as they can become part of the vacuum envelope of the neutron generator, but it can also apply to vacuum/gaseous electronic associated particle detectors. Because the occlude film is thin (typically less than 10 μm), the associated particles pass through the occlude film to reach the detector medium, and the occlude film serves a dual role of blocking the detector from ions, low energy particles (electrons and ions) and low-energy photons. An additional film is, by way of example, interposed between the occlude film and the detector to further limit stray particles, to serve as a diffusion barrier (against tritium, for example), or to provide selectivity of the associated particles to be detected. One illustrative example of the combined target-detector configuration is provided in FIG. 10 for the case of a scintillating associated particle detector with a photodiode measurement.

Because the associated particles have very short ranges, the associated particles are all stopped by the structure of the vacuum envelope, the occluder film or the detector. The primary signal pollutant, x-rays, are generally not stopped by the detector, and may not be stopped by the vacuum envelope. This can be exploited to correct the associated particle detector signal for unintended photon detection. If a second detector is used to detect the escaping x-rays, preferably the same kind of detector located near the associated particle detector, then a measure of the photon pollution in the associated particle detector is made and subtracted from that signal to yield the portion of the signal that is due to associated particles, which, in turn, can be used to estimate the neutron production rate. Another benefit of the second detector is that it can be used to compensate for changes in detector sensitivity with temperature, so long as the two detectors are physically sufficiently close to share a similar temperature. In principle the ability to compensate for x-rays and temperature using a second detector is applicable to any associated particle type or configuration.

Figure 11:
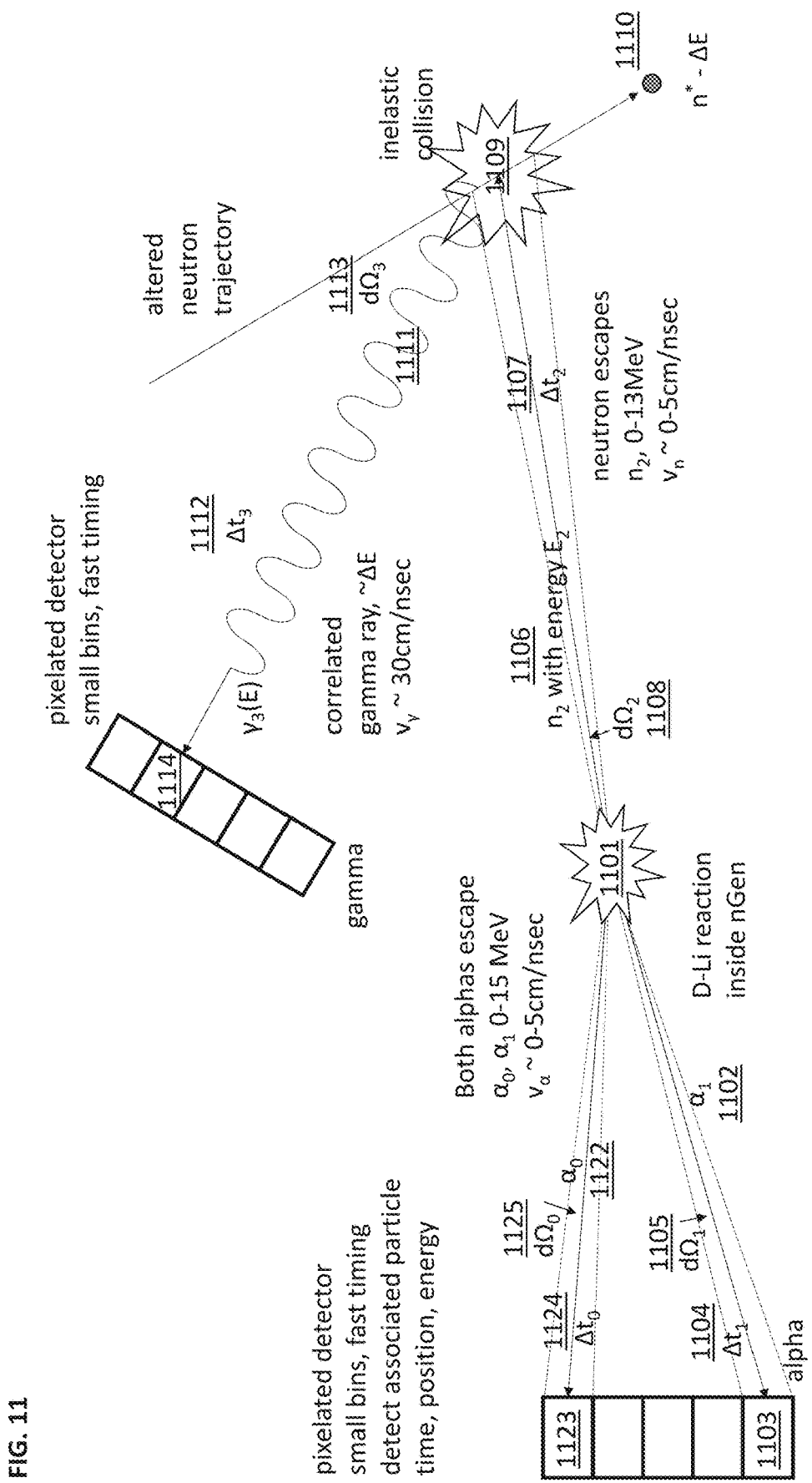
FIG. 11 illustratively depicts an example process for carrying out associated particle imaging using the two alpha D-Li reaction in accordance with the current disclosure.

Turning to FIG. 11, an illustrative example is provided of the process for associated particle imaging using the D-Li reaction which produces two distinct alpha particles and one high-energy neutron. Since the D-Li reaction is a three-body problem, the energy and direction of the resulting neutron is indeterminant without sampling the alpha particles in time and space. A D-Li fusion reaction 1101 occurs, resulting in a releasing of a neutron $n_2$ with energy $E_2$ on a particular trajectory with relative position along a trajectory determinable based on a calculated time-of-flight $t_2$. The associated particle detector first intercepts an alpha particle $\alpha_0$ 1122 on a pixel 1123 at a time to 1124 at a subtending solid angle 1125 that is determined by a neutron emission spot size and a geometry of the system between the pixel and the neutron emission spot size. A second pixel 1103 detects an associated particle $\alpha_1$ 1102 on a pixel 1103 at a time $t_1$ 1124 at a subtending solid angle 1105. Both associated particles are generated from the $^8$Be breakup and the relative timing of corresponding detection events on the pixelated detectors 1103 and 1123 will be correlated with their energy and deduced from the distance from the fusion reaction 1101 and its geometric spot size/volume properties. Furthermore, the effective neutron energy $n_2$ with $E_2$ and trajectory on a solid angle 1108 is determined using position relative to time $t_2$.

This D-Li API process is used for inelastic gamma-ray imaging without utilizing radioactive tritium in the neutron generator. As depicted in FIG. 11, the inelastic collisions 1109 between the neutron and materials will generate correlated gamma-rays 1111 that can be resolved with the additional imaging system. The arrangement (and operation thereof) described herein facilitates generating "tagged" high-energy (>10 MeV) neutrons for inelastic gamma-ray imaging and fast neutron radiographic applications.

Figure 12:
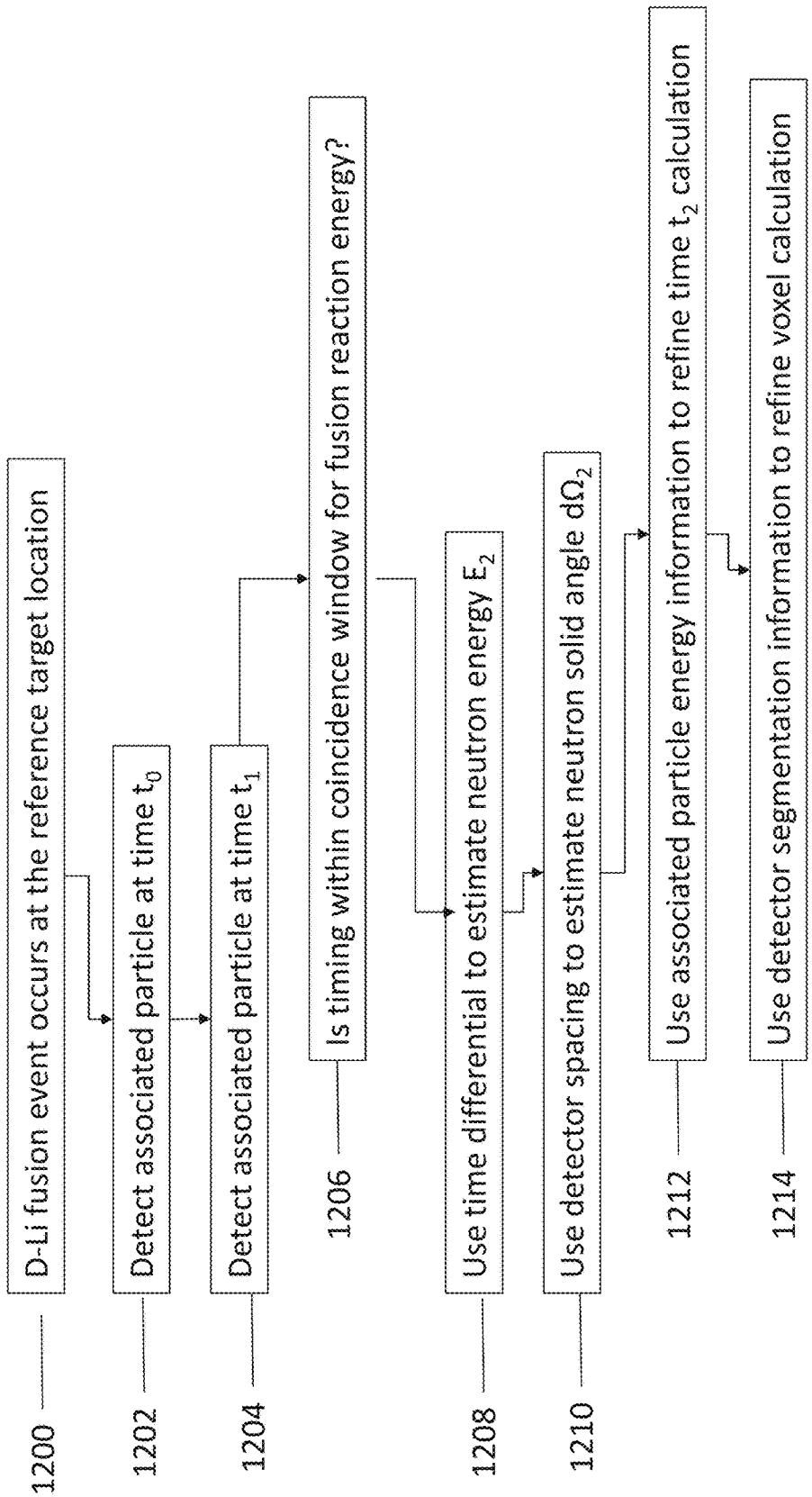
FIG. 12 illustratively depicts a method for estimating neutron energy, trajectory and timing using multiple associated particles in coincidence in accordance with the current disclosure.

Turning to FIG. 12, a flowchart highlights a basic process for detecting two associated charged particles to determine the time-dependent trajectory for a neutron resulting from a multi-body fusion event, such as the D-Li reaction, where the neutron velocity and position is unknown. This information is useful for correlation with inelastic gamma-rays, neutron and Compton imaging. During 1200, a D-Li fusion event occurs within the occluder material, and a high-energy neutron is emitted into an observable trajectory—meaning the corresponding charged particles from this reaction, i.e. two alpha particles with different energies, are viewable by the pixelated detectors with the neutron generator. At 1202, a first charged particle is detected at t0 on a detector. At 1204, a second charged particle is detected in a similar manner at t1.

Thereafter, during 1206, the timestamps t0 and t1, for both events, are compared for coincidence. The energy release, Q, of the D-Li reaction is 15.2 MeV and this allows for a specific set of energies and angles for the resulting neutron and alpha particles. If a time differential between the detection times of the two alpha particles is sufficiently small (i.e. the detection events were sufficiently close in time) to be coincidence, then the neutron energy (velocity) and solid angle can be estimated using the information associated with detecting the two alpha particles. The distance between each detector element and the neutron emission source point will define the distance for a time-of-flight calculation for each charged particle.

Figure 13:
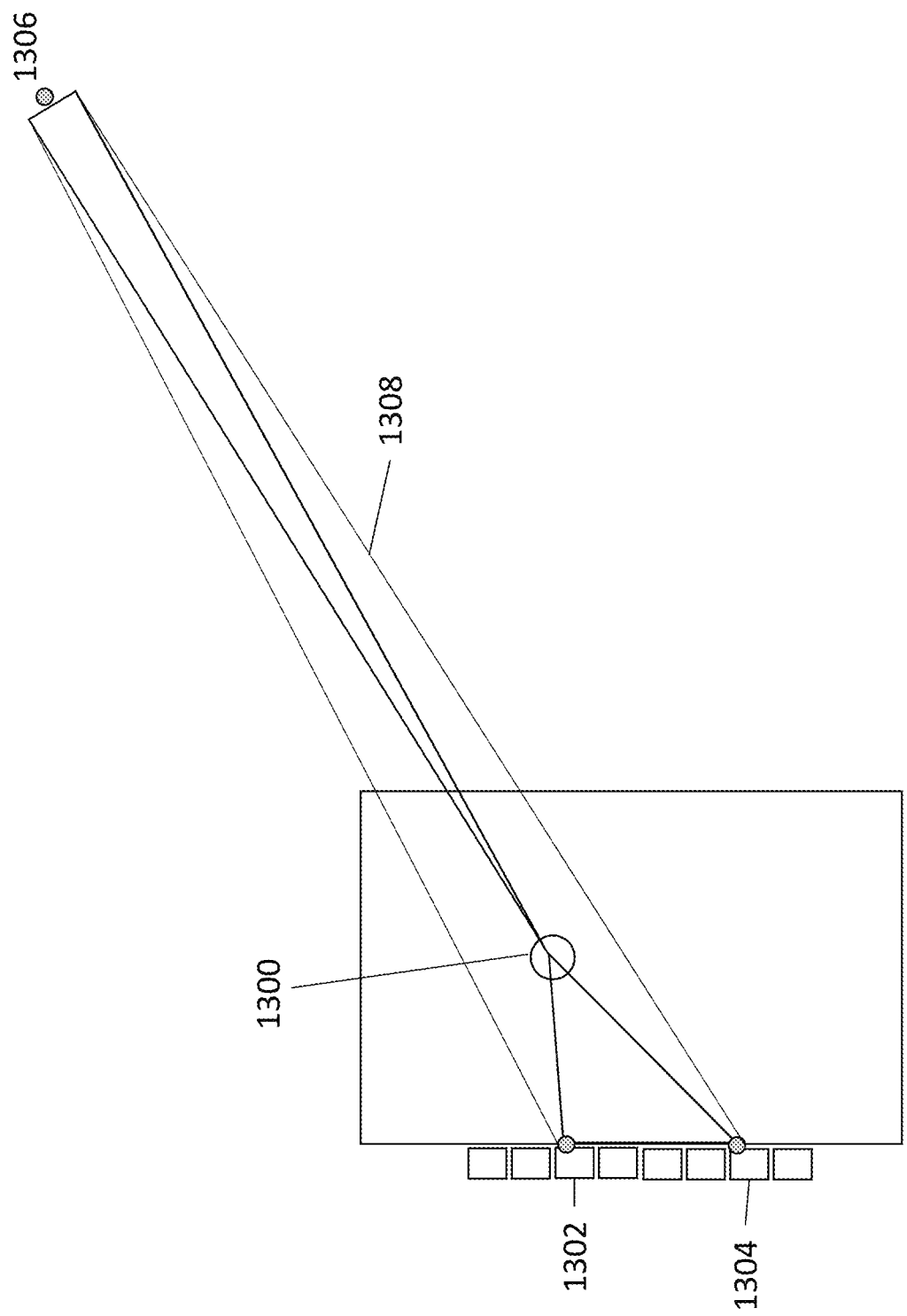
FIG. 13 illustratively depicts the velocity-weighted center-of-mass reference plane in accordance with the disclosure.

At 1208, and with reference to FIG. 13, the time differential between the two alpha particle detection events is used to estimate the charged particle energies based on a common point and common time of origination. The remaining energy from the reaction Q is given to the neutron on an opposing velocity-weighted center-of-mass coordinate reference.

At 1210, the pixelated detector spacing between elements 1302 and 1304 and a neutron generation source point 1300 is used to determine the angle between the charged particles to define a center-of-mass plane 1308 for the emission of the neutron that results in an effective neutron solid angle.

At 1212, if the pixelated detectors have built-in charged particle energy resolution in addition to timing, then additional refinement of the neutron velocity is utilized to improve the relative timing error for a neutron trajectory 1306 (flight path).

At 1214, the segmentation of the detector and pixel spacing can be used to further refine the neutron spatial location to refine the voxel for neutron trajectory. Combining these pieces of information can refine the solid angle voxel and the overall statistics on the neutron trajectory is improved for image quality and inelastic gamma-ray localization.

The associated particle technique described herein facilitates direct measurement of fusion neutron activity, for absolute source rate quantification, without sampling generated neutrons.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An inspection apparatus comprising:
   a grounded target region;
   a neutron generator that produces, by a fusion reaction, a neutron and one or more corresponding charged particles; and
   an associated particle imaging (API) detector comprising a particle detector that detects the one or more corresponding charged particles, wherein the particle detector comprises at least one particle detector element that facilitates determining a trajectory, origination time, and a velocity of the neutron based upon a detection, by an element of the at least one particle detector element, of the corresponding charged particles,
   wherein the neutron generator comprises:
      a positively-biased ion source; and
      a neutron generating source point that receives an ion beam from the positively-biased ion source through a vacuum tube assembly,
   wherein the neutron generating source point provides a directed volume of corresponding charged particles,
   wherein the vacuum tube assembly comprises a hermetically-sealed vacuum vessel that couples the positively-biased ion source and the grounded target region,
   wherein the grounded target region contains the API detector and the neutron generating source point, and
   wherein charged particle detection events are transmitted from the associated particle imaging detector to external sensors through a coupling that preserves hermetic sealing of the hermetically-sealed vacuum vessel.

2. The apparatus of claim 1, wherein the API detector is configured to acquire coincidence timing and spatial detection of corresponding charged particles from a fusion reaction to determine a neutron origination point and trajectory based on an energy of a fusion reaction allocated between the neutron and the corresponding charged particles.

3. The apparatus of claim 2, wherein a velocity-weighted center-of-mass coordinate reference plane is generated from a three-body fusion reaction between a neutron, two corresponding charged particles, and a neutron generating source point.

4. The apparatus of claim 3, wherein a time differential between detection events of the corresponding charged particles, a distance between each particle detector element at which a detection event, of the detection event occurred, and the neutron generating source point are used to determine:
   coincidence and to estimate energies of the corresponding charged particles based upon a common point and a common time of origination, and
   remaining energy from the reaction Q that is given to the neutron in the velocity-weighted center of mass coordinate reference plane.

5. The apparatus of claim 2, wherein particle detector physical spacing, between detector elements that detect charged particle events, is used to determine an angle between paths of the corresponding charged particles to determine an effective neutron solid angle trajectory.

6. The apparatus of claim 1, wherein the particle detectors have built-in charged particle energy resolution to further refine a neutron velocity and decrease relative timing error for a neutron flight path.

7. The apparatus of claim 1, wherein the apparatus further comprises a processor configured to analyze acquired data of the charged particle detection events to determine: a neutron energy, a neutron generation time, and a neutron trajectory.

8. The apparatus of claim 1, wherein segmentation particle detectors and relative spacing from the neutron generating source point define a resolvable neutron trajectory voxel for image quality and inelastic gamma-ray localization.

9. The apparatus of claim 1, wherein the at least one particle detector element provides information for resolving energy of the corresponding charged particles.

10. The apparatus of claim 1, wherein the spatial, temporal and energy information from the API detector is used to determine the neutron velocity and trajectory for gamma-ray imaging or neutron imaging.

11. The apparatus of claim 1 further comprising a gamma-ray detector assembly including one or more gamma-ray detectors.

12. The apparatus of claim 11, wherein the one of more gamma-ray detectors contain a set of collimating structures arranged as a set co-oriented conical surfaces.

13. The apparatus of claim 12 wherein the one or more gamma-ray detector elements are in a stacked arrangement.

14. The apparatus of claim 1 further comprising neutron detectors.

15. The apparatus of claim 1, wherein there is an additional reference detector, which may be identical to the API detector, but is shielded from the charged particles to provide a reference signal level that allows the charged particle contribution to be determined by scaling and subtracting the reference signal from the associated particle detector signal.

16. An inspection apparatus comprising:
a grounded target region;
a neutron generator that produces, by a fusion reaction, a neutron and one or more corresponding charged particles; and
an associated particle imaging (API) detector comprising a particle detector that detects the one or more corresponding charged particles, wherein the particle detector comprises at least one particle detector element that facilitates determining an absolute calibration of the neutron generation rate based upon a detection, by an element of the at least one particle detector element, of the corresponding charged particles,
wherein the neutron generator comprises:
a positively-biased ion source; and
a neutron generating source point that receives an ion beam from the positively-biased ion source through a vacuum tube assembly,
wherein the neutron generating source point provides a directed volume of corresponding charged particles,
wherein the vacuum tube assembly comprises a hermetically-sealed vacuum vessel that couples the positively-biased ion source and the grounded target region,
wherein the grounded target region contains the API detector and the neutron generating source point, and
wherein charged particle detection events are transmitted from the associated particle imaging detector to external sensors through a coupling that preserves hermetic sealing of the hermetically-sealed vacuum vessel.

17. The apparatus of claim 16, wherein the particle detector is directly coupled to the neutron generating source point to receive charged particle through an occluder material.

18. The apparatus of claim 16, wherein the occluder material is selected from the group consisting of: lithium, titanium, beryllium, zirconium, and erbium.

19. The apparatus of claim 16, wherein the particle detector is selected from the group consisting of: a scintillator, semiconductor diode, semiconductor phototransistor, a vacuum-electronic multiplier, a channel multiplier, a microchannel plate, and a gaseous tube detector.

20. The apparatus of claim 16, further comprising an additional reference detector, which may be identical to the API detector, but is shielded from to the charged particles to provide a reference signal level that allows the charged particle contribution to be determined by scaling and subtracting the reference signal from the associated particle detector signal.

* * * * *